United States Patent
Ogata et al.

(10) Patent No.: US 12,235,113 B2
(45) Date of Patent: Feb. 25, 2025

(54) PARKING SUPPORT APPARATUS

(71) Applicant: Faurecia Clarion Electronics Co., Ltd., Saitama (JP)

(72) Inventors: Takehito Ogata, Tokyo (JP); Toshihisa Kuwahara, Saitama (JP); Ryosuke Umino, Saitama (JP); Katsumi Iwano, Saitama (JP)

(73) Assignee: Faurecia Clarion Electronics Co., Ltd., Saitama (JP)

(*) Notice: Subject to any disclaimer, the term of this patent is extended or adjusted under 35 U.S.C. 154(b) by 145 days.

(21) Appl. No.: 16/698,356

(22) Filed: Nov. 27, 2019

(65) Prior Publication Data
US 2020/0166349 A1 May 28, 2020

(30) Foreign Application Priority Data
Nov. 28, 2018 (JP) .................. 2018-222512

(51) Int. Cl.
*G01C 21/34* (2006.01)
*B60W 30/06* (2006.01)
(Continued)

(52) U.S. Cl.
CPC .......... *G01C 21/3407* (2013.01); *B60W 30/06* (2013.01); *G01C 21/005* (2013.01);
(Continued)

(58) Field of Classification Search
CPC ....... B60W 30/06; B62D 15/027–0285; G05D 1/0088
(Continued)

(56) References Cited

U.S. PATENT DOCUMENTS 6,611,744 B1 * 8/2003 Shimazaki ........... B62D 15/028
180/443
8,140,209 B2 3/2012 Adachi et al.
(Continued)

FOREIGN PATENT DOCUMENTS

CN 101309818 A 11/2008
DE 102013103569 A1 * 10/2013 ......... B62D 15/0285
(Continued)

OTHER PUBLICATIONS

Kwon Jae Hee—English description of KR-20140142444-A via Espacenet Patent Translate, retrieved Oct. 15, 2021. (Year: 2021).*
(Continued)

*Primary Examiner* — Rami Khatib
*Assistant Examiner* — Paul Allen
(74) *Attorney, Agent, or Firm* — Volpe Koenig

(57) ABSTRACT

A parking support apparatus includes: a first parking space setting unit that sets a first parking space including information of a parking position and a parking angle of a vehicle at a parking completion position; a second parking space setting unit that calculates a second parking space, which is obtained by correcting the parking angle of the first parking space, based on information of measurement of the first parking space by using a vehicle surrounding sensor which measures a surrounding area of the vehicle; a parking space determination unit that calculates reliability of the second parking space and determines to use the first parking space or the second parking space based on the calculated reliability; and a parking route generation unit that generates a parking route to the first parking space or the second parking space determined by the parking space determination unit.

11 Claims, 20 Drawing Sheets

(51) Int. Cl.
*G01C 21/00* (2006.01)
*G08G 1/14* (2006.01)

(52) U.S. Cl.
CPC ..... *G01C 21/3837* (2020.08); *G01C 21/3881* (2020.08); *G08G 1/143* (2013.01)

(58) Field of Classification Search
USPC .......................................... 701/23–28, 41–44
See application file for complete search history.

(56) References Cited

U.S. PATENT DOCUMENTS

| | | | |
|---|---|---|---|
| 2002/0095246 A1* | 7/2002 | Kawazoe | G05D 1/0246 348/148 |
| 2009/0123028 A1 | 5/2009 | Satonaka | |
| 2011/0087406 A1* | 4/2011 | Barth | B60Q 1/48 701/41 |
| 2012/0303258 A1* | 11/2012 | Pampus | B60W 30/0956 701/300 |
| 2014/0244070 A1* | 8/2014 | Inagaki | B62D 15/0285 701/1 |
| 2015/0032319 A1* | 1/2015 | Kim | B62D 15/027 701/23 |
| 2016/0203376 A1* | 7/2016 | Ishigami | G06V 40/20 382/103 |
| 2017/0186186 A1* | 6/2017 | Yamaguchi | G06T 7/74 |
| 2017/0253236 A1* | 9/2017 | Hayakawa | B60W 30/06 |
| 2019/0196481 A1* | 6/2019 | Tay | G01S 17/86 |
| 2019/0291722 A1* | 9/2019 | Maeda | B60W 10/18 |

FOREIGN PATENT DOCUMENTS

| | | | | |
|---|---|---|---|---|
| DE | 102014111011 A1 * | 2/2016 | ......... | B62D 15/0285 |
| DE | 102016220637 A1 * | 4/2018 | | |
| EP | 1 950 098 A1 | 7/2008 | | |
| EP | 2093129 A2 | 8/2009 | | |
| EP | 2 623 398 A1 | 8/2013 | | |
| JP | 2009-196408 | 9/2009 | | |
| JP | 2009-286355 A | 12/2009 | | |
| JP | 2011 175508 A | 9/2011 | | |
| JP | 2013-220745 A | 10/2013 | | |
| JP | 2014034321 A * | 2/2014 | | |
| JP | 2014094726 A * | 5/2014 | | |
| JP | 2016215691 A * | 12/2016 | | |
| KR | 20130035386 A * | 4/2013 | ............ | B60W 10/20 |
| KR | 20140142444 A * | 12/2014 | | |

OTHER PUBLICATIONS

Otoshi Tetsuya—English description of JP-2016215691-A via Espacenet Patent Translate, retrieved Oct. 14, 2021. (Year: 2021).*
You K—English Description of KR-20130035386-A via Espacenet Patent Translate, retrieved Mar. 30, 2022. (Year: 2022).*
Akiyama K—English Description of DE-102013103569-A1 via Espacenet Patent Translate, retrieved Mar. 30, 2022. (Year: 2022).*
Lauber F—English Description of DE-102016220637-A1 via Espacenet Patent Translate, retrieved Apr. 9, 2022. (Year: 2022).*
Akiyama K—English description of JP-2014094726-A via Espacenet Patent Translate, retrieved Nov. 8, 2023 (Year: 2023).*
Geiger T—English description of DE-102014111011-A1 via Espacenet Patent Translate, retrieved Nov. 8, 2023 (Year: 2023).*
Akiyama K—English Description of JP-2014034321-A via Espacenet Patent Translate, retrieved Jun. 24, 2024 (Year: 2024).*
European extended search report dated Mar. 26, 2020 regarding European counterpart Patent Application No. 19212268.7 corresponding to U.S. Appl. No. 16/698,356 (10 pages).
Japanese Office Action for JP Patent Application No. 2018-222512 dated Jun. 21, 2022, 6 pages, with machine translation.
Chinese Office Action issued on Sep. 27, 2022 for Chinese Patent Application No. 201911182472.2.

* cited by examiner

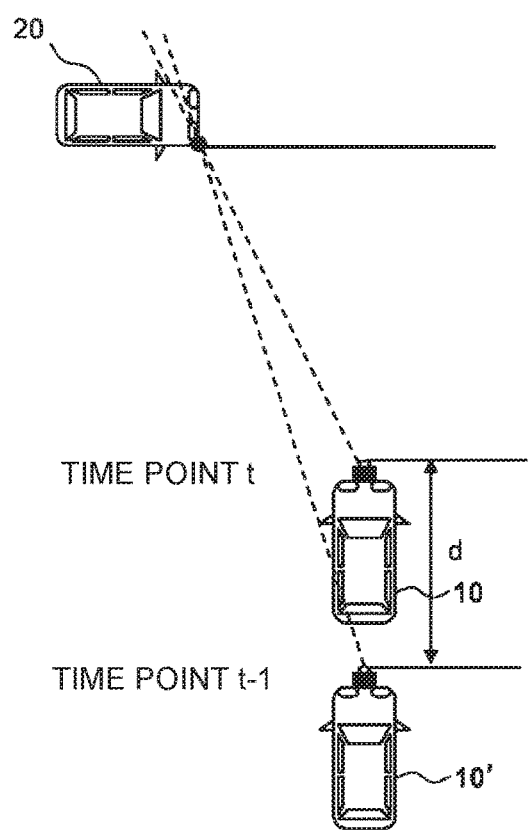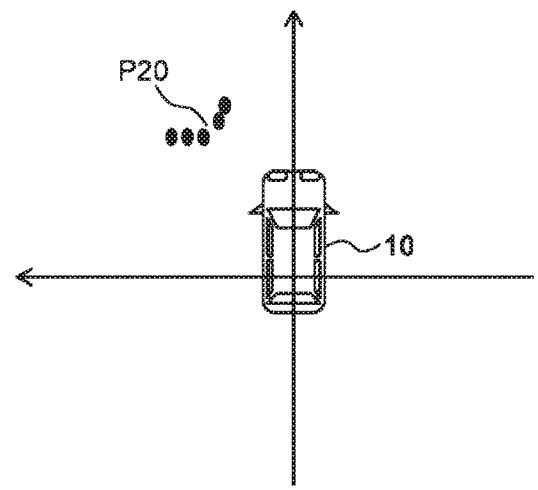
*FIG.4A*  *FIG.4B*

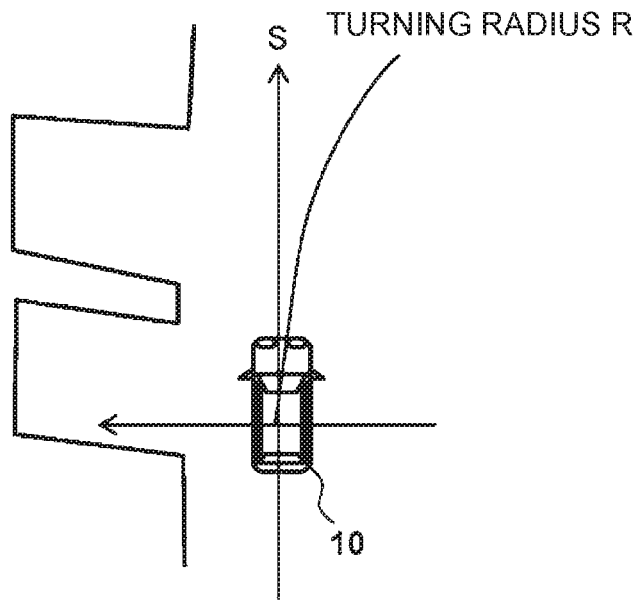
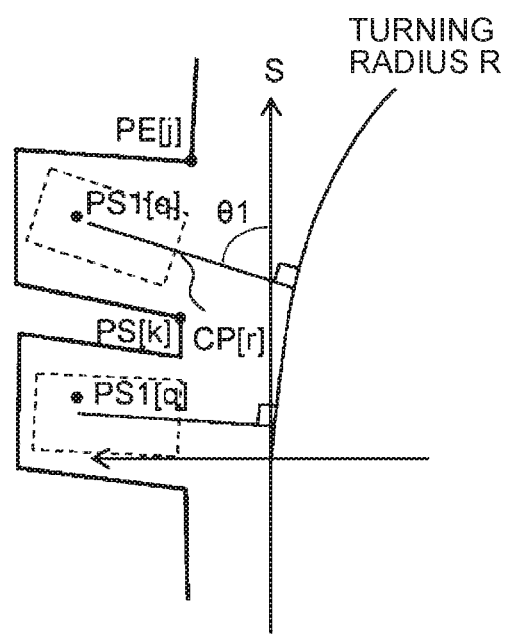
FIG.9A              FIG.9B

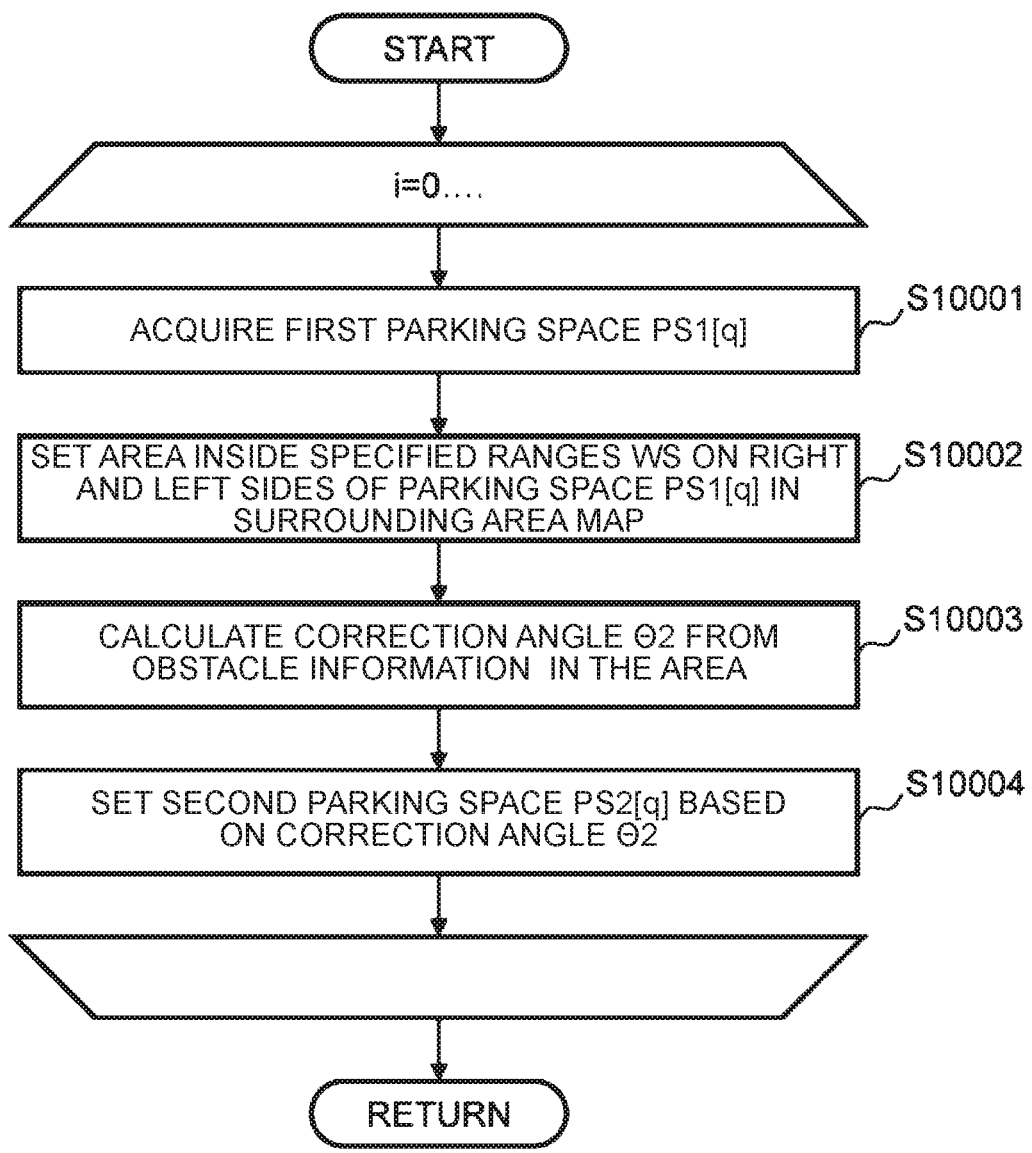

PARKING SUPPORT APPARATUS

TECHNICAL FIELD

The present invention relates to a parking support apparatus.

BACKGROUND ART

In recent years, a parking support apparatus which detects a parking space around a vehicle and automatically performs a part or whole of the driver's parking operations has been put into practical use.

The parking support apparatus calculates a parking route from a current position of the vehicle to the parking space according to a parking position and parking angle of the vehicle in the detected parking space. Then, while parking the vehicle along the parking route, some deviation occurs from the parking position and the parking angle of the initially detected parking space. In this case, it becomes necessary to recalculate the parking route.

PTL 1 discloses a method for: specifying a parking space based on a detection result of a sonar, recalculating a parking route by detecting an inclination of a vehicle relative to the parking space after the vehicle enters the parking space; and letting the vehicle move out of the parking space once and park again.

CITATION LIST

Patent Literature

PTL 1: Japanese Laid-Open Patent Publication No. 2009-286355

SUMMARY OF THE INVENTION

Technical Problem

The method described in PTL 1 requires the vehicle to move again to park the vehicle after entering the parking space, so that it has a problem of requiring time to park the vehicle.

Solution to Problem

According to the aspect of the present invention, a parking support apparatus comprises: a first parking space setting unit that sets a first parking space including information of a parking position and a parking angle of a vehicle at a parking completion position; a second parking space setting unit that calculates a second parking space, which is obtained by correcting the parking angle of the first parking space, based on information of measurement of the first parking space by using a vehicle surrounding sensor which measures a surrounding area of the vehicle; a parking space determination unit that calculates reliability of the second parking space and determines to use the first parking space or the second parking space based on the calculated reliability; and a parking route generation unit that generates a parking route to the first parking space or the second parking space determined by the parking space determination unit.

Advantageous Effects of the Invention

According to the present invention, it becomes no longer necessary to move the vehicle again to park after entering the parking space and, therefore, the time required to park the vehicle can be reduced.

BRIEF DESCRIPTION OF DRAWINGS

FIGS. 4A and 4B are explanatory diagrams of processing by an obstacle position measurement unit according to the first embodiment;

FIGS. 9A and 9B are explanatory diagrams of processing by the first parking space setting unit according to the first embodiment;

FIG. 10 is a flowchart illustrating processing by a second parking space setting unit according to the first embodiment;

DESCRIPTION OF EMBODIMENTS

First Embodiment

Figure 1:
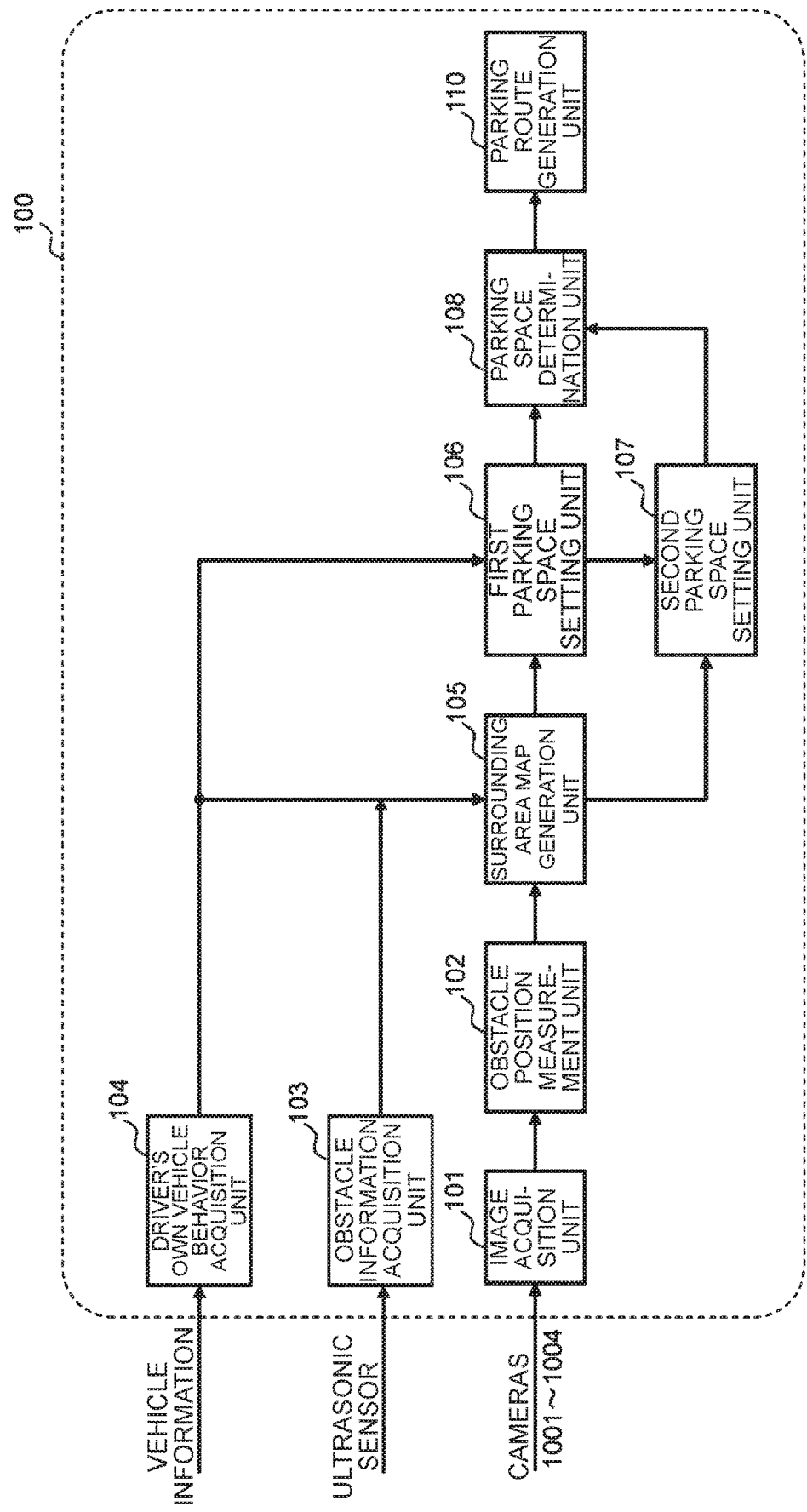
FIG. 1 is a block diagram of a parking support apparatus according to a first embodiment.

A first embodiment of the present invention will be explained with reference to FIG. 1 to FIG. 11D. FIG. 1 is a block diagram of a parking support apparatus 100 according to the first embodiment.

The parking support apparatus 100 is incorporated into a camera device, which is mounted in a vehicle, or into an integrated controller and supports parking the vehicle.

In this embodiment, the parking support apparatus 100 supports parking the vehicle on the basis of the results of sensing by cameras 1001 to 1004 and a sonar (which is not illustrated in the drawing) which are mounted around the driver's own vehicle (the driver's vehicle or the target vehicle).

The parking support apparatus 100 can be configured with a program which will be illustrated in flowcharts described later, and a computer which includes a CPU, a memory, and so on. Moreover, the entire processing or part of the processing may be implemented by a hard logic circuit. Furthermore, this program can be stored in advance and provided in a storage medium of the parking support apparatus 100. Alternatively, it is possible to store and provide the program in an independent storage medium or to record and store the program in the storage medium of the parking support apparatus 100 via a network line. The program may be supplied as various forms of a computer-readable computer program product such as a data signal (carrier wave). The same applies to a parking support apparatus 200 according to a second embodiment, a parking support apparatus 300 according to a third embodiment, and a parking support apparatus 400 according to a fourth embodiment which will be described later.

The parking support apparatus 100 includes, as illustrated in FIG. 1, an image acquisition unit 101, an obstacle position measurement unit 102, an obstacle information acquisition unit 103, a driver's own vehicle behavior acquisition unit 104, a surrounding area map generation unit 105, a first parking space setting unit 106, a second parking space setting unit 107, a parking space determination unit 108, and a parking route generation unit 110. Incidentally, without limitation to the above-described configuration, the parking support apparatus 100 may be configured of a computer including a CPU, a memory, an I/O, and so on and be configured to execute programs illustrated in flowcharts described later.

Figure 2:
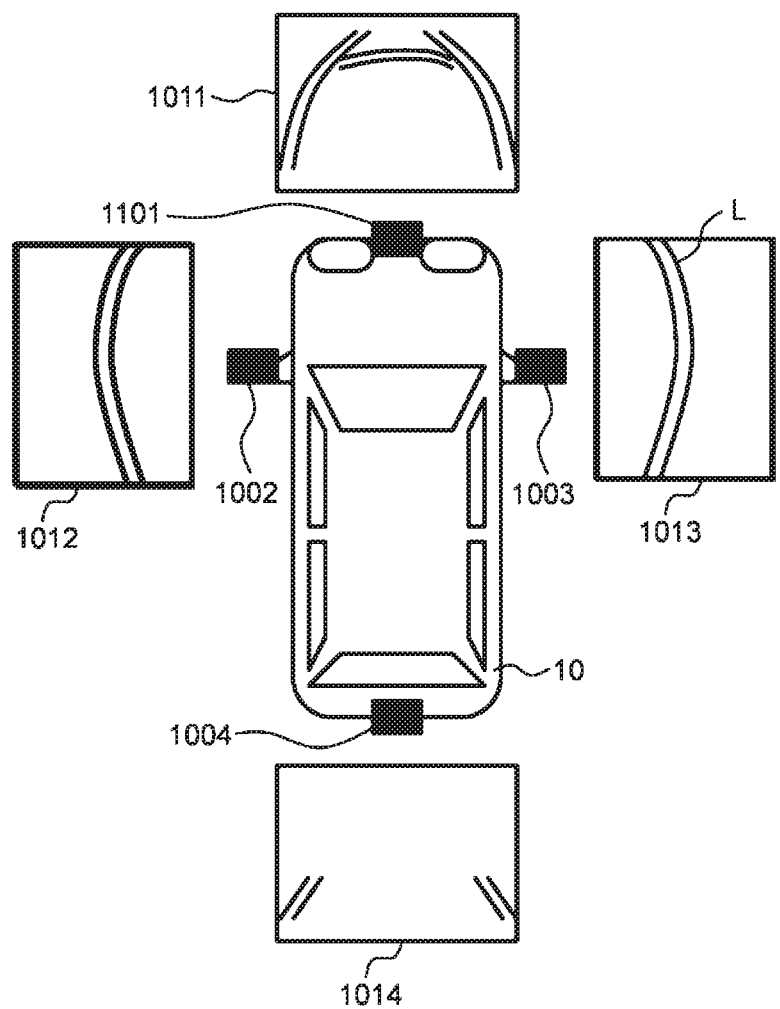
FIG. 2 is an explanatory diagram of an image acquisition unit according to the first embodiment.

The image acquisition unit 101 acquires images including a surrounding environment of the driver's own vehicle 10. The image acquisition unit 101 acquires any one or more images among images 1011 to 1014 of a surrounding area of the driver's own vehicle 10 from the cameras 1001 to 1004 which are mounted at front, rear, right, and left sides of the vehicle 10 as one of the driver's own vehicle surrounding sensors for measuring the surrounding area of the driver's own vehicle as illustrated in FIG. 2. In this embodiment, four images 1011 to 1014 which can be acquired from the cameras 1001 to 1004 are acquired, respectively. The acquired images 1011 to 1014 are recorded as two-dimensional arrays in a RAM. An input image will be hereinafter expressed as IMGSRC[c][x][y]. The letter "c" represents an ID of each of the four cameras and "x" and "y" respectively represent coordinates of the relevant image. The respective images 1011 to 1014 illustrated in FIG. 2 are image examples when the vehicle 10 is parked forward (front-end parking) in a parking space and a frame line L for a parking area is captured in the images.

The obstacle position measurement unit 102 extracts one or more feature points FP[p] from the input images IMGSRC[c][x][y] acquired from the image acquisition unit 101. Then, the position of an obstacle having the feature points FP[p] from the vehicle 10 is measured based on movements of the feature points FP[p] in images, which are tracked chronologically (time-series changes of the feature points). The obstacle position measurement unit 102 measures IOP[p] which is point group information of 3-dimensional distances from an image coordinate table IFP[p] of the respective feature points by detecting the feature points FP[p] from the input images IMGSRC[x][y] and tracking them chronologically. Under this circumstance, the IFP[p] is a table array having elements of the image coordinates (x, y), the IOP[p] is a table array having elements of relative coordinates (x, y, z) whose origin is a rear wheel axle of the driver's own vehicle, and "p" represents an ID of the relevant information when a plurality of pieces of information are detected. The details of processing by the obstacle position measurement unit 102 will be described later.

The obstacle information acquisition unit 103 acquires obstacle information SOP[b] of an object(s) around the driver's own vehicle according to a detection signal of an ultrasonic sensor (sonar) which detects the object(s) around the driver's own vehicle 10 and is mounted on the driver's own vehicle 10 as one of the driver's own vehicle surrounding sensors which measure the surrounding area of the driver's own vehicle. The obstacle information SOP[b] is a table array represented by world coordinates having elements of the relative coordinates (x, y) whose origin is the rear wheel axle of the driver's own vehicle and which does not include the height; and "b" is an ID number of the relevant object when a plurality of objects are detected. These pieces of object information may be acquired by directly inputting a sensor signal to the parking support apparatus 100 or acquired via communication using a LAN (Local Area Network).

The driver's own vehicle behavior acquisition unit 104 acquires vehicle behaviors DRC calculated in the parking support apparatus 100 or externally. The vehicle behaviors DRC include velocities (VX, VY) and yaw rates (YR) relative to the two-dimensional world coordinates which do not include the height.

The surrounding area map generation unit 105 generates a surrounding area map MP by using the obstacle information IOP[p] acquired from the obstacle position measurement unit 102, the obstacle information SOP[b] acquired from the obstacle information acquisition unit 103, and the vehicle behaviors DRC acquired from the driver's own vehicle behavior acquisition unit 104. Specifically speaking, by using these pieces of information, two-dimensional coordinates of obstacles including detection results in the past are integrated as a point group MOP[d] of two-dimensional absolute coordinates whose origin is the rear wheel axle position of the driver's own vehicle 10 upon the activation of the parking support apparatus 100 and which do not include the height, thereby generating the surrounding area map MP. The letter "d" is an ID number of the relevant object when a plurality of objects are detected. The details of processing by the surrounding area map generation unit 105 will be described later.

The first parking space setting unit 106 calculates a first parking space PS1[$q$] where the driver's own vehicle 10 can be parked, around the driver's own vehicle 10 from the obstacle point group MOP[d] in the surrounding area map MP. The first parking space PS1[$q$] is a table array having three elements, that is, the position (x, y) of the vehicle and an angle θ of the vehicle in the absolute coordinates upon the completion of parking and "q" is an ID number of the relevant parking space when a plurality of parking spaces are detected. The details of processing by the first parking space setting unit 106 will be described later.

Now, the angle of the vehicle and the parking angle in the parking space will be explained. These angles are angles relative to a reference axis when a line perpendicular to the rear wheel axle of the driver's own vehicle 10 at a time point of activation of the parking support apparatus 100 is set as the reference axis. In other words, a traveling direction of the driver's own vehicle 10 is the reference axis and angles from the traveling direction towards the left side are defined as plus and angles from the traveling direction towards the right side are defined as minus. The following embodiments will be explained based on these definitions; however, azimuth directions may also be used. When the azimuth directions are used, for example, the north direction is set as the reference axis and angles from this reference axis towards the left side are defined as plus and angles from the reference axis towards the right side are defined as minus.

The second parking space setting unit 107 calculates a second parking space PS2[q], which is obtained by correcting the first parking space PS1[q], from the first parking space PS1[q] and the obstacle point group MOP[d] in the surrounding area map MP. The details of processing by the second parking space setting unit 107 will be described later.

The parking space determination unit 108 determines either the first parking space PS1[q] or the second parking space PS2[q] as a parking space PS[q] depending on reliability of the second parking space PS2[q] by using the first parking space PS1[q] and the second parking space PS2[q]. The details of processing by the parking space determination unit 108 will be described later.

The parking route generation unit 110 generates a parking route for parking the driver's own vehicle 10 in accordance with the parking position and the parking angle of the parking space PS[q] with respect to the parking space PS[q] determined by the parking space determination unit 108. A known means is used for the parking route generation processing by the parking route generation unit 110.

<Regarding Obstacle Position Measurement Unit>

Next, the processing by the obstacle position measurement unit 102 will be explained with reference to FIG. 3 and FIGS. 4A and 4B.

Figure 3:
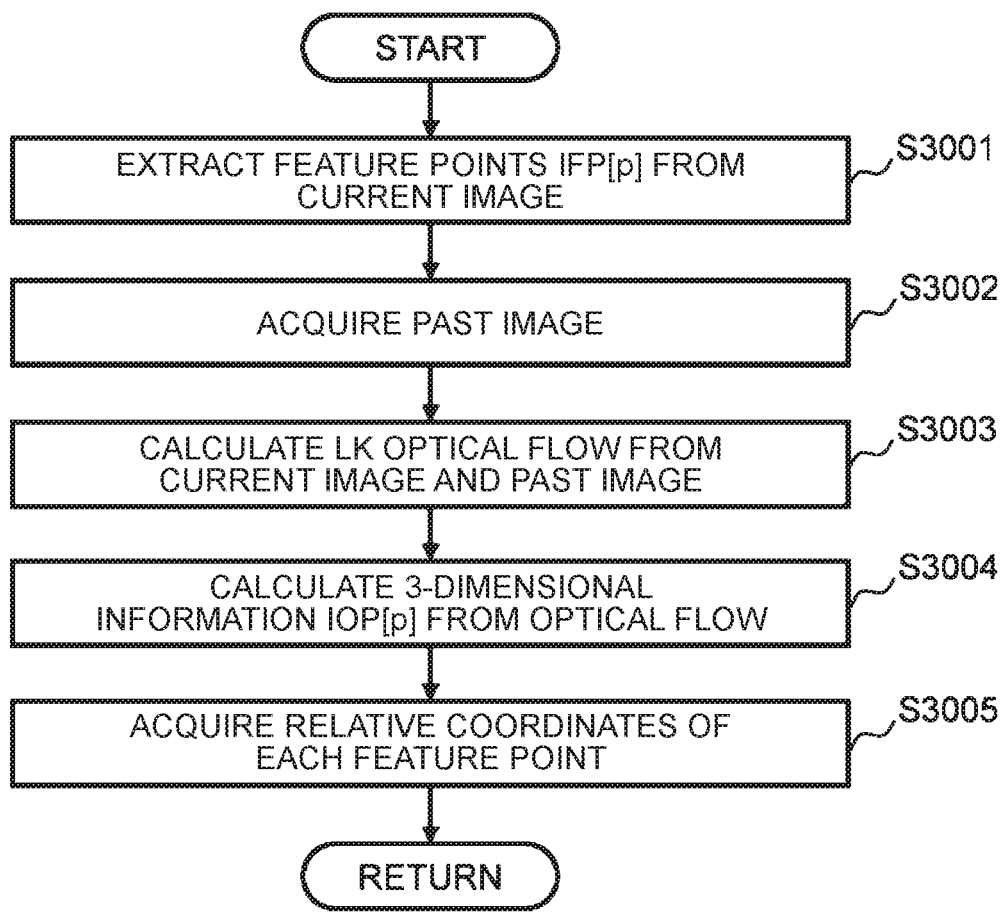
FIG. 3 is a flowchart illustrating processing by an obstacle position measurement unit according to the first embodiment.

FIG. 3 is a flowchart illustrating the processing by the obstacle position measurement unit 102. FIGS. 4A and 4B are explanatory diagrams of the processing by the obstacle position measurement unit 102.

The obstacle position measurement unit 102 executes processing on input images IMGSRC[c][x][y] acquired from the cameras 1001 to 1004 which face the traveling direction of the driver's own vehicle 10. While the driver's own vehicle 10 is moving forward, a front camera 1001 is used; and while the driver's own vehicle 10 is moving backward, a rear camera 1004 is used.

In step S3001 of FIG. 3, the obstacle position measurement unit 102 extracts feature points IFP[p] of an obstacle(s) from the input images IMGSRC[c][x][y]. A known method such as Harris Corner is used to extract the feature points IFP[p]. As a result, image coordinates are obtained for each feature point. FIG. 4A illustrates a case where a parked vehicle 20 exists as an obstacle ahead of a current position of the driver's own vehicle 10 on the left at time point t.

Next, in step S3002, a past image IMGSRC_P before a specified time of day, which is acquired from the same camera is acquired. The parked vehicle 20 exists, as illustrated in FIG. 4A, ahead of the past position of the driver's own vehicle 10' at time point t−1 on the left. Incidentally, the position of the driver's own vehicle 10 at the time point t is separated by a distance d from the position of the driver's own vehicle 10' at the time point t−1.

Subsequently, in step S3003, the positions of the respective feature points IFP[p] in the past image IMGSRC_P corresponding to the feature points IFP[p] in the current image IMGSRC are calculated by an optical flow method and mobile vectors FP_VX[p], FP_VY[p] of the respective feature points are acquired. A known method such as the Lucas-Kanade method is used as the optical flow method.

Then, in step S3004, three-dimensional positions of the respective feature points IFP[p] around the driver's own vehicle 10 are calculated by using the feature points IFP[p] and the mobile vectors FP_VX[p], FP_VY[p]. A known means is used as the calculation method. In this embodiment, a movement amount of the driver's own vehicle calculated by using the mobile vectors in the images and the driver's own vehicle positions DRC[t] and DRC[t−1] acquired by CAN is used. Under this circumstance, "t" in the driver's own vehicle positions DRC[t] and DRC[t−1] is a sign representing timing of processing and the movement amount DRC[t] of the driver's own vehicle means X, Y, and a yaw angle in a coordinate system whose origin is the center of the rear wheel axle of the driver's own vehicle. The movement amount of X, Y, and the yaw angle is obtained from the driver's own vehicle positions DRC[t] and DRC[t−1].

Lastly in step S3005, the three-dimensional positions of the respective feature points are converted into the coordinate system whose origin is the center of the rear wheel axle of the vehicle 10, and the converted three-dimensional positions are stored as obstacle information IOP[p]. As the past position of the driver's own vehicle 10' and the current position of the driver's own vehicle 10 change as illustrated in FIG. 4A, a parallax is created and the distance from the obstacle(s) can be measured. As a result of measurement of the distances from the respective feature points in the images of the parked vehicle 20 which is the obstacle, a plurality of measurement points P20 are obtained as illustrated in FIG. 4B.

<Regarding Surrounding Area Map Generation Unit>

Next, the processing by the surrounding area map generation unit 105 will be explained with reference to FIG. 5 and FIGS. 6A to 6D.

Figure 5:
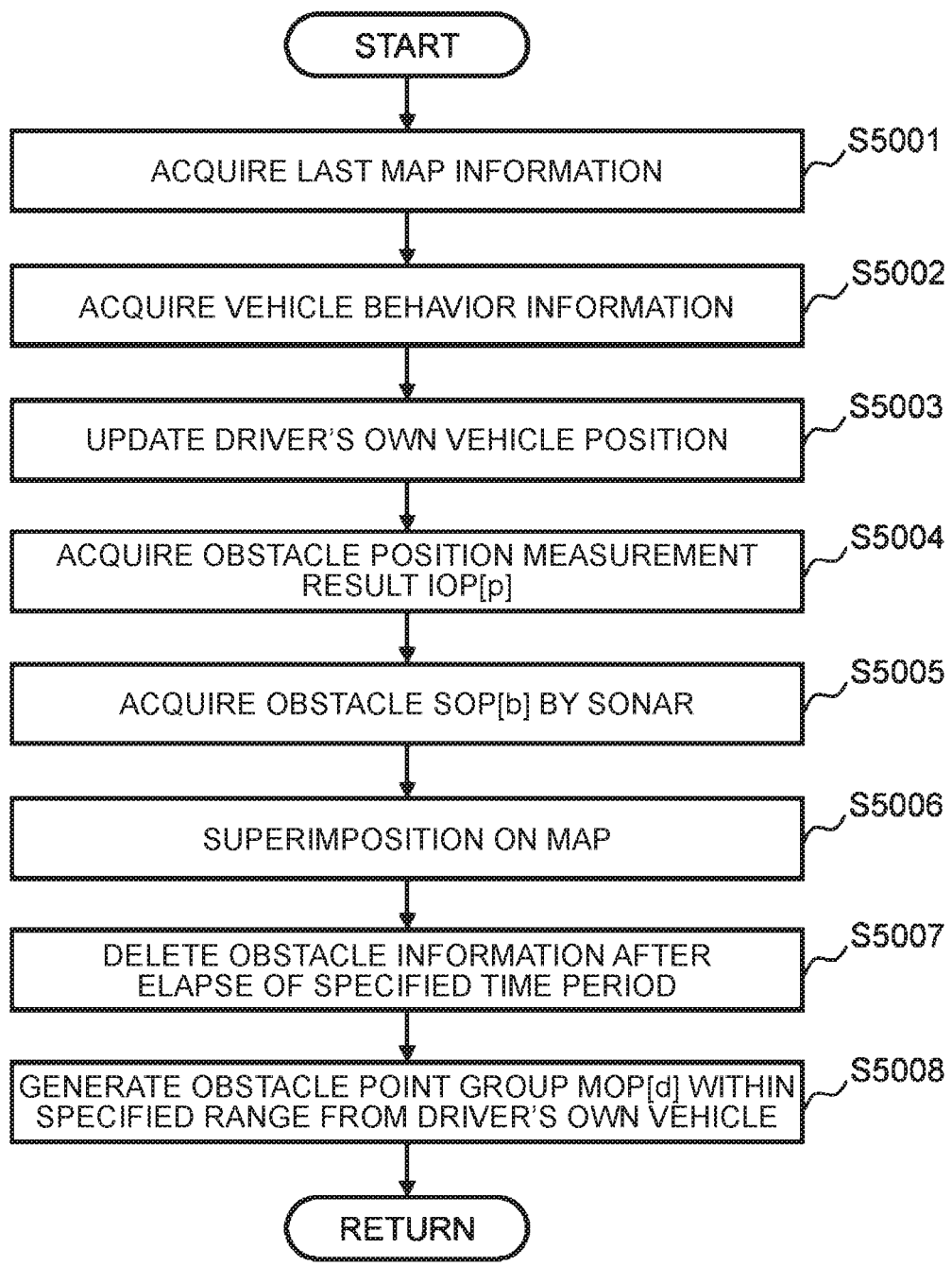
FIG. 5 is a flowchart illustrating processing by a surrounding area map generation unit according to the first embodiment.

FIG. 5 is a flowchart illustrating the processing by the surrounding area map generation unit 105. FIGS. 6A to 6D are explanatory diagrams of the processing by the surrounding area map generation unit 105.

The surrounding area map generation unit 105 stores the point group IOP[p] calculated by the obstacle position measurement unit 102 and the obstacle point group SOP[b] acquired by the obstacle information acquisition unit 103, including past values. This embodiment is designed so that the entire obstacle information is managed with a two-dimensional surrounding area map MP which has a certain position as its origin and does not have height information; and the point group IOP[p] and the point group SOB[b] which are calculated successively are pasted one after another onto the surrounding area map MP[x][y] by using the vehicle behaviors DRC acquired by the driver's own vehicle behavior acquisition unit 104. Under this circumstance, MP[x][y] is a two-dimensional array and x and y are coordinates of the array separated by a certain resolution.

In step S5001 of FIG. 5, the surrounding area map MP which was processed last time is acquired.

Next, in step S5002, the vehicle behaviors DRC are acquired from the driver's own vehicle behavior acquisition unit 104.

Then, in step S5003, the rear wheel axle position (x, y) of the driver's own vehicle 10 on the surrounding area map MP is updated.

Next, in step S5004, the distance point group IOP[p] calculated by the obstacle position measurement unit 102 is acquired.

Furthermore, in step S5005, the sonar point group SOP[b] acquired by the obstacle information acquisition unit 103 is acquired.

Then, in step S5006, the point group IOP[p] by the cameras and the distance point group SOP[b] by the sonar are mapped onto the surrounding area map MP by using the vehicle behaviors DRC.

Furthermore, in step S5007, information acquired in the past is removed from all pieces of the obstacle information mapped onto the surrounding area map MP.

Lastly, in step S5008, a point group MOP[d] of the obstacle information included within a specified range from the driver's own vehicle position on the surrounding area map MP is generated.

Under this circumstance, a certainty factor is set to each grid of the two-dimensional map; and noise in a sensing result can be removed by determining that an obstacle exists only in a grid(s) whose certainty factor is equal to or more than a specified threshold value.

For example, in step S5006, when past information and a plurality of sensing results are detected at the same time in the same grid, its certainty is increased; and in step S5007, by subtracting a specified value from all the certainty factors, the certainty factor increases with respect to a grid(s) with redundant sensing results and the certainty factor decreases with respect to a grid(s) for which the sensing result is not obtained repeatedly, so that old information will be removed.

Figure 6A:
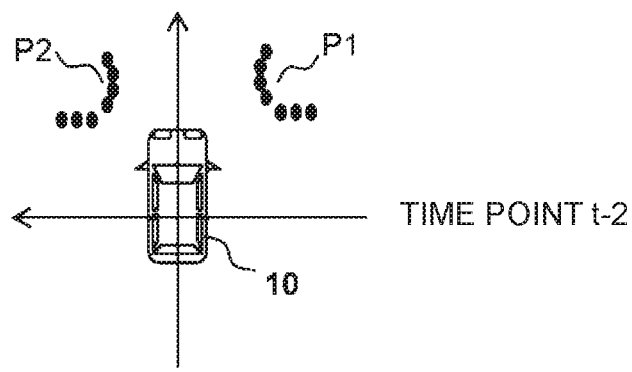
FIGS. 6A to 6D are explanatory diagrams of processing by the surrounding area map generation unit according to the first embodiment.
Figure 6D:
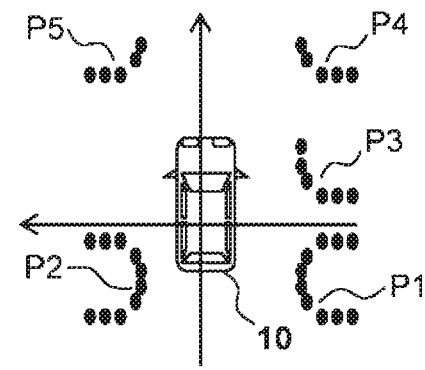
Figure 6B:
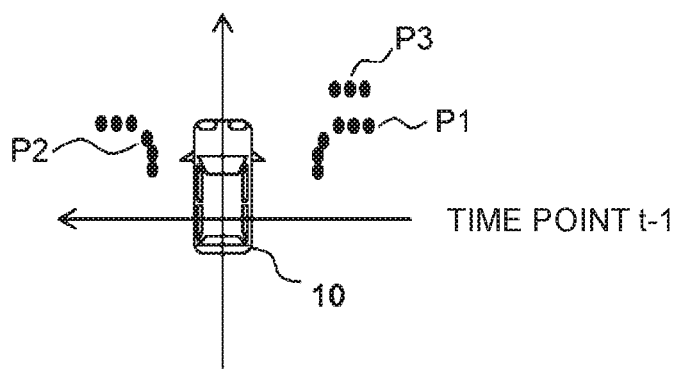
Figure 6C:
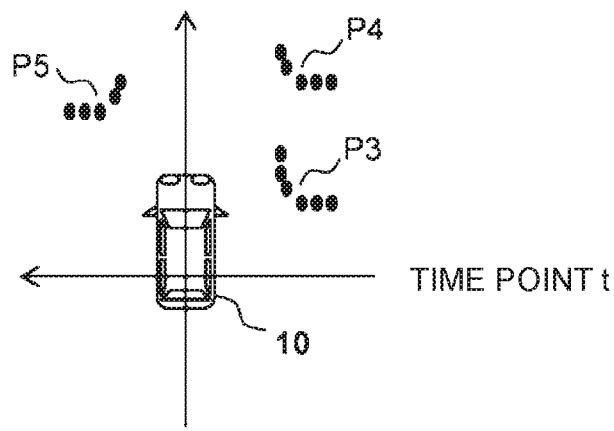

FIG. 6A illustrates a state where obstacles P1 and P2 are detected by the point groups IOP[p] and SOP[b] around the driver's own vehicle 10, which are acquired at time point t−2. FIG. 6B illustrates a state where obstacles P1, P2, and P3 are detected by the point groups IOP[p] and SOP[b] acquired at the time point t−1. FIG. 6C illustrates a state where obstacles P3, P4, P5 are detected by the point groups IOP[p] and SOP[b] acquired at the time point t. The obstacles detected at the respective timings are different; however, if the obstacles are integrated by using the driver's own vehicle behaviors DRC[t−2], DRC[t−1], and DRC[t] at the time point t, the time point t−1, and the time point t−2, respectively, a point group MOP[d] of the obstacle information is generated and the obstacles are detected as measurement points P1, P2, P3, P4, and P5 as illustrated in FIG. 6D, thereby obtaining the surrounding area map.

<Regarding First Parking Space Setting Unit>

The processing by the first parking space setting unit 106 will be explained with reference to FIG. 7, FIGS. 8A to 8D, and FIGS. 9A and 9B.

Figure 7:
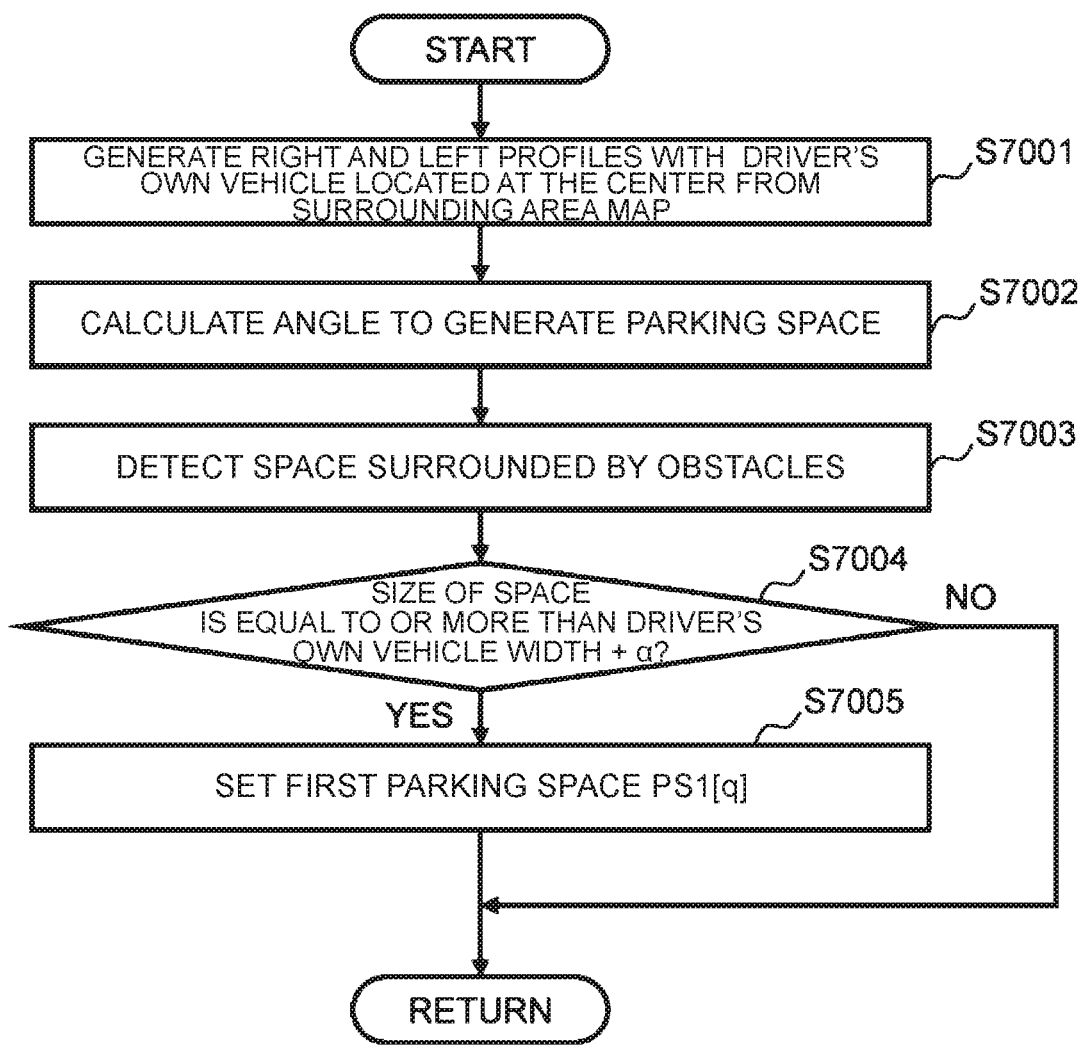
FIG. 7 is a flowchart illustrating processing by a first parking space setting unit according to the first embodiment.

FIG. 7 is a flowchart illustrating the processing by the first parking space setting unit 106. Furthermore, FIGS. 8A to 8D and 9A, 9B are explanatory diagrams of the processing by the first parking space setting unit 106.

The first parking space setting unit 106 calculates the parking space PS1[q] by using the obstacle point group MOP[d] in the surrounding area map MP. The parking space PS1[q] is a table including three pieces of information, that is, the parking position (X1, Y1) and the parking angle θ1 of the driver's own vehicle.

In step S7001 of FIG. 7, profiles of right and left environments with the driver's own vehicle 10 located at the center are generated. Regarding the profile, a reference line perpendicular to the rear wheel axle of the driver's own vehicle 10 is set and profile measurement points are set along the reference line and with a specified distance (for example, 10 cm) between the adjacent profile measurement points. Then, straight lines are extended within a specified range (for example, ±5 m) on the right and left sides from each measurement point in directions perpendicular to the reference line and a search is conducted until each straight line comes close to the obstacle point group MOP[d] (when the distance between the straight line and the obstacle point becomes equal to or less than a threshold value) or until the maximum distance (for example, 10 m) is reached. Then, profiles LL, LR which are sets of line segments are obtained respectively on the right and left sides of the driver's own vehicle by connecting the respective obtained search end points.

Figure 8A:
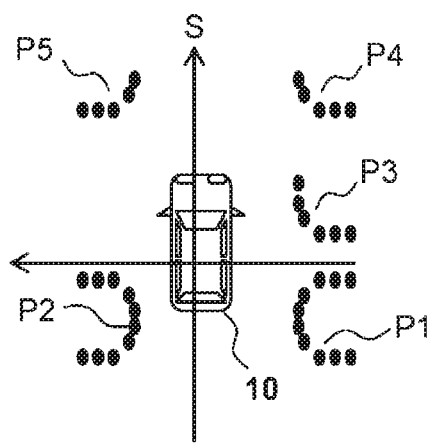
FIGS. 8A to 8D are explanatory diagrams of processing by the first parking space setting unit according to the first embodiment.
Figure 8C:
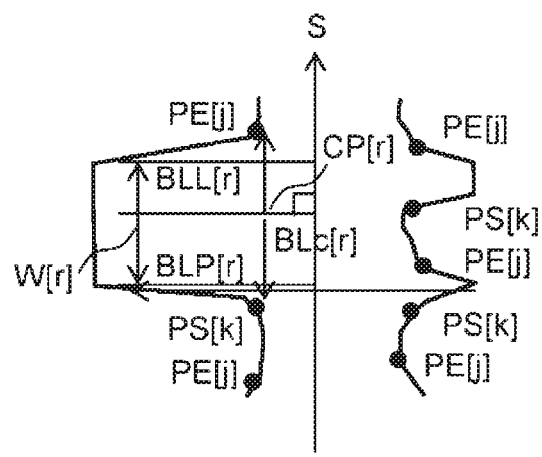
Figure 8B:
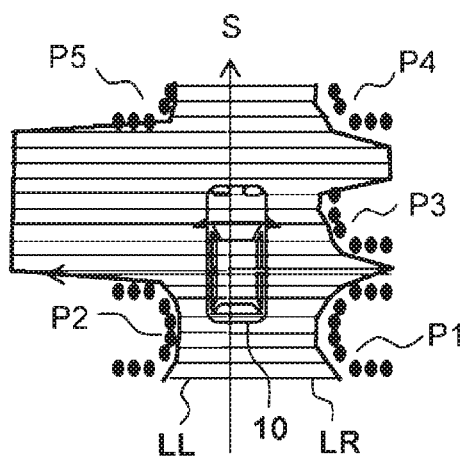

FIGS. 8A to 8D are diagrams explaining the processing by the first parking space setting unit 106. FIG. 8A illustrates an example in which the measurement points P1 to P5 of the obstacles exist around the driver's own vehicle 10. FIG. 8B illustrates a state where the profiles LL, LR are obtained by the processing in step S7001. Referring to FIG. 8B, straight lines are extended on the right and left sides in directions perpendicular to the reference axis S and the obtained respective search end points are connected, thereby obtaining the profiles LL, LR which are sets of line segments respectively on the right and left sides of the driver's own vehicle 10.

Next, in step S7002 of FIG. 7, a reference angle for generating a parking space is set. Under this circumstance, the reference angle is an angle perpendicular to the reference axis S of the driver's own vehicle 10.

Subsequently, in step S7003, the profiles LL, LR are searched based on the reference angle, which was set in S7002, for a space where the vehicle can be parked. This search is conducted by searching the profiles LL, LR from the front side of the driver's own vehicle 10 to its rear side and detecting a change point(s) PE[j] where the relevant profile LL, LR expands, and a change point(s) PS[k] where the relevant profile LL, LR reduces. Then, a center point CP[r] is found from the adjacent PE[j] and PS[k]. Furthermore, a reference line segment BLc[r] which passes through the center point CP[r] and is parallel to the reference angle, and whose length is the driver's own vehicle length L is set; and lines are moved towards outside from the reference line BLc[r] on both the right and left sides until these lines contact the relevant profile. Under this circumstance, the line segments at the positions in contact with the profile are defined as line segments BLL[r], BLR[r], respectively, and a space with the width W[r] defined by these two line segments is detected.

FIG. 8C is a diagram explaining the processing in step S7003. The change point(s) PE[j] at which the relevant profile LL, LR expands, and the change point(s) PS[k] at which the relevant profile LL, LR reduces are detected and the center point CP[r] is found from the adjacent PE[j] and PS[k]. The reference line segment BLc[r] is set, the line segments BLL[r], BLR[r] at the positions in contact with the profile are found, and the space with the width W[r] is detected.

Figure 8D:
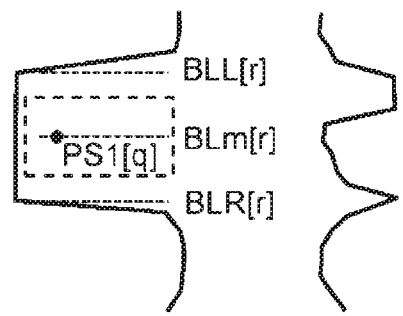

Then, in step S7004 of FIG. 7, when the detected space with the width W[r] is larger than the width W of the driver's own vehicle 10+a margin MW, the processing proceeds to step S7005; an average line segment BLm[r] of the line segments BLL[r], BLR[r] is calculated; and when an end point CPm[r] of the line segment BLm[r] on the driver's own vehicle 10 side is defined as a top end position of the driver's own vehicle 10, the rear wheel axle position on the line segment BLm[r] is set as a parking position (X1, Y1) and the reference angle is set as a parking angle θ1, which are then registered in the first parking space PS1[$q$]. FIG. 8D is an example of the parking space PS1[$q$] obtained by the processing of step S7003.

FIGS. 9A and 9B are an example in which the reference angle calculated in step S7002 of FIG. 7 is not fixed, but is set according to a turning radius of the driver's own vehicle. FIG. 9A illustrates that the driver's own vehicle 10 is about to turn with a turning radius R relative to the reference axis S. A route to turn is calculated based on the vehicle behaviors DRC acquired by the driver's own vehicle behavior acquisition unit 104 and a steering angle. FIG. 9B illustrates that when calculating the reference line BLc[$r$] from the center point CP[$r$] after calculating the change points PE[$j$] and PS[$k$] in step S7003, a perpendicular line extended from the center point CP[$r$] to the turning radius R of the driver's own vehicle is defined as a reference angle θ1. Accordingly, the parking space PS1[$q$] can be calculated according to the turning radius R of the driver's own vehicle.

<Regarding Second Parking Space Setting Unit>

The content of the processing by the second parking space setting unit 107 will be explained with reference to FIG. 10 and FIGS. 11A to 11D. This processing by the second parking space setting unit 107 is executed after the time point when the processing by the first parking space setting unit 106 is executed, and at a second position where the vehicle comes closer to the target parking space than a first position where the processing by the first parking space setting unit 106 is executed.

FIG. 10 is a flowchart illustrating the processing by the second parking space setting unit 107. Furthermore, FIGS. 11A to 11D are diagrams explaining the processing by the second parking space setting unit 107.

The second parking space setting unit 107 calculates the second parking space PS2[$q$] by using the obstacle point group MOP[$d$] in the surrounding area map MP included in the first parking space PS1[$q$] acquired by the first parking space setting unit 106. The second parking space PS2[$q$] is a table including three pieces of information, that is, the parking position (X2, Y2) and the parking angle θ2 of the driver's own vehicle 10.

In step S10001 of FIG. 10, the first parking space PS1[$q$] is acquired from the first parking space setting unit 106.

Figure 11A:
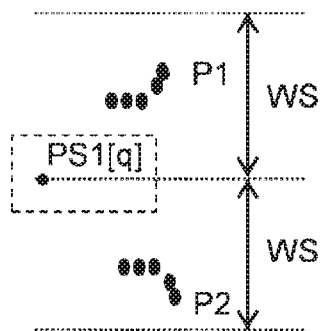
FIGS. 11A to 11D are explanatory diagrams of processing by the second parking space setting unit according to the first embodiment.

Next, in step S10002, the obstacle point group MOP[$d$] in the surrounding area map is searched for the obstacle point group MOP'[$e$] in the specified ranges WS on the right and left sides of the first parking space PS1[$q$] located at the center. FIGS. 11A to 11D are diagrams explaining the processing by the second parking space setting unit 107. FIG. 11A illustrates a state where the obstacle point group MOP'[$e$] in the specified right and left ranges WS is searched for in step S10002.

Next, in step S10003 of FIG. 10, a correction angle θ2 is calculated from the obstacle point group MOP'[$e$]. Two types of processing for calculating the correction angle θ2 will be explained below and either one of them may be used.

Figure 11C:
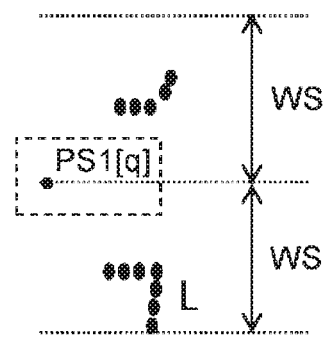
Figure 11B:
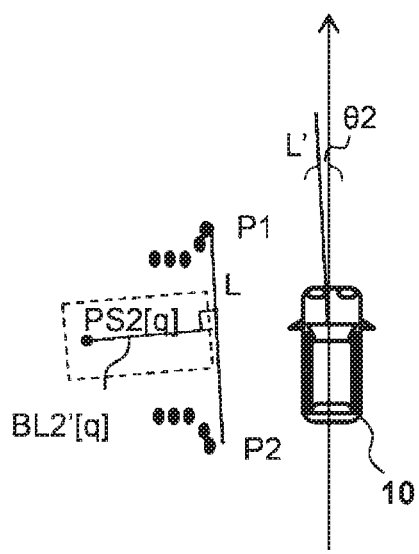

One type is to select two points at both ends of the first parking space PS1[$q$] closest to the driver's own vehicle and set an angle formed by a straight line connecting these two points as the correction angle θ2. FIG. 11B illustrates this example in step S10003, where two measurement points P1, P2 close to the driver's own vehicle 10 are selected and an angle formed by a straight line L connecting these two points is defined as the correction angle θ2. A straight line L' in this drawing is a straight line which is parallel to the straight line L.

Figure 11D:
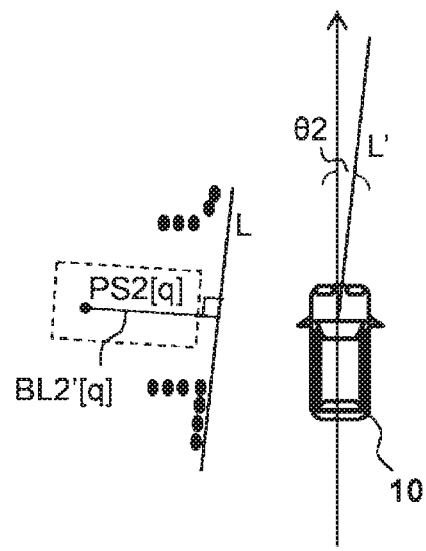

Another type is to detect a straight line, by a method such as the Hough transform, from the obstacle information of each of both ends of the first parking space PS1[$q$] and define an angle formed by the straight line as the correction angle θ2. FIG. 11C and FIG. 11D illustrate this example in step S10003 where a straight line L is detected from the obstacle information by the method such as the Hough transform as illustrated in FIG. 11C. Then, as illustrated in FIG. 11D, an angle formed by the straight line L is defined as the correction angle θ2. The straight line L' in this drawing is a straight line which is parallel to the straight line L.

Lastly, in step S10004 of FIG. 10, the second parking space PS2[$q$] is calculated based on the correction angle θ2 according to the following processing.

Firstly, a reference line BL2[$q$] for the correction angle θ2, which passes through the rear wheel axle position (X1, Y1) of the first parking space PS1[$q$], is generated.

Next, the profiles LL, LR calculated by the first parking space setting unit 106 are acquired and lines are moved externally on both sides from and in parallel with the reference line BL2[$q$] until they contact the profile LL(LR). Under this circumstance, line segments at positions in contact with the profile are defined as line segments BLL2[$q$], BLR2[$q$], respectively, and an average line segment of the line segments BLL2[$q$], BLR2[$q$] is calculated as a reference line BL2'[q], thereby generating a second parking space PS2[$q$] with this reference line BL2'[q] located at the center.

<Regarding Parking Space Determination Unit>

The processing by the parking space determination unit 108 will be explained. In this embodiment, two types of processing will be explained. The processing by this parking space determination unit 108 is executed after the execution of the processing by the second parking space setting unit 107 and at the second position close to a target parking space of the vehicle 10.

Firstly, first processing is to calculate the difference between the parking angle θ1[$q$] for the first parking space PS1[$q$] and the parking angle θ2[$q$] for the second parking space PS2[$q$]; and when the difference is small, the second parking space PS2[$q$] is determined as the parking space PS[q]. Otherwise, the first parking space PS1[$q$] is determined as the parking space PS[q]. Specifically speaking, when the difference between the parking angle θ1[$q$] and the parking angle θ2[$q$] is small, it is determined that the reliability of the second parking space PS2[$q$] is high, and the second parking space PS2[$q$] is thereby used.

Second processing is to set a specified area R with the second parking space PS2[$q$] located at its center and find a measurement degree of the obstacle point group MOP[$d$] in the surrounding area map MP included in the area R. The measurement degree indicates, for example, how large the number of the measurement points is, the size of the measurement points, and the density of the measurement points. Then, when this measurement degree is equal to or more than a specified value, the second parking space PS2[$q$] is determined as the parking space PS[q]. Otherwise, the first parking space PS1[$q$] is determined as the parking space PS[q]. Specifically speaking, when the measurement degree of the obstacle point group MOP[$d$] is equal to or more than a specified value, it is determined that the reliability of the second parking space PS2[$q$] is high, and the second parking space PS2[$q$] is thereby used.

The first parking space PS1[$q$] is calculated and a more accurate parking space is calculated as the second parking space PS2[$q$] by using the obstacle point group MOP[$d$] in the surrounding area map MP in the vicinity of the first parking space PS1[$q$] as explained above. Then, the parking space determination unit 108 judges the reliability of the second parking space PS2[q]; and if the second parking space PS2[q] is reliable, the second parking space PS2[q] is used; and if the sensing result is reliable, the second parking space PS2[q] is used to generate a preferable parking route when starting to park the vehicle, so that the vehicle can be parked with the shortest parking route. Furthermore, if the second parking space PS2[q] is not reliable, the vehicle is parked in the same manner as conventionally performed by using the first parking space PS1[q].

Second Embodiment

A second embodiment of the present invention will be explained with reference to FIG. 12 to FIG. 14C.

Figure 12:
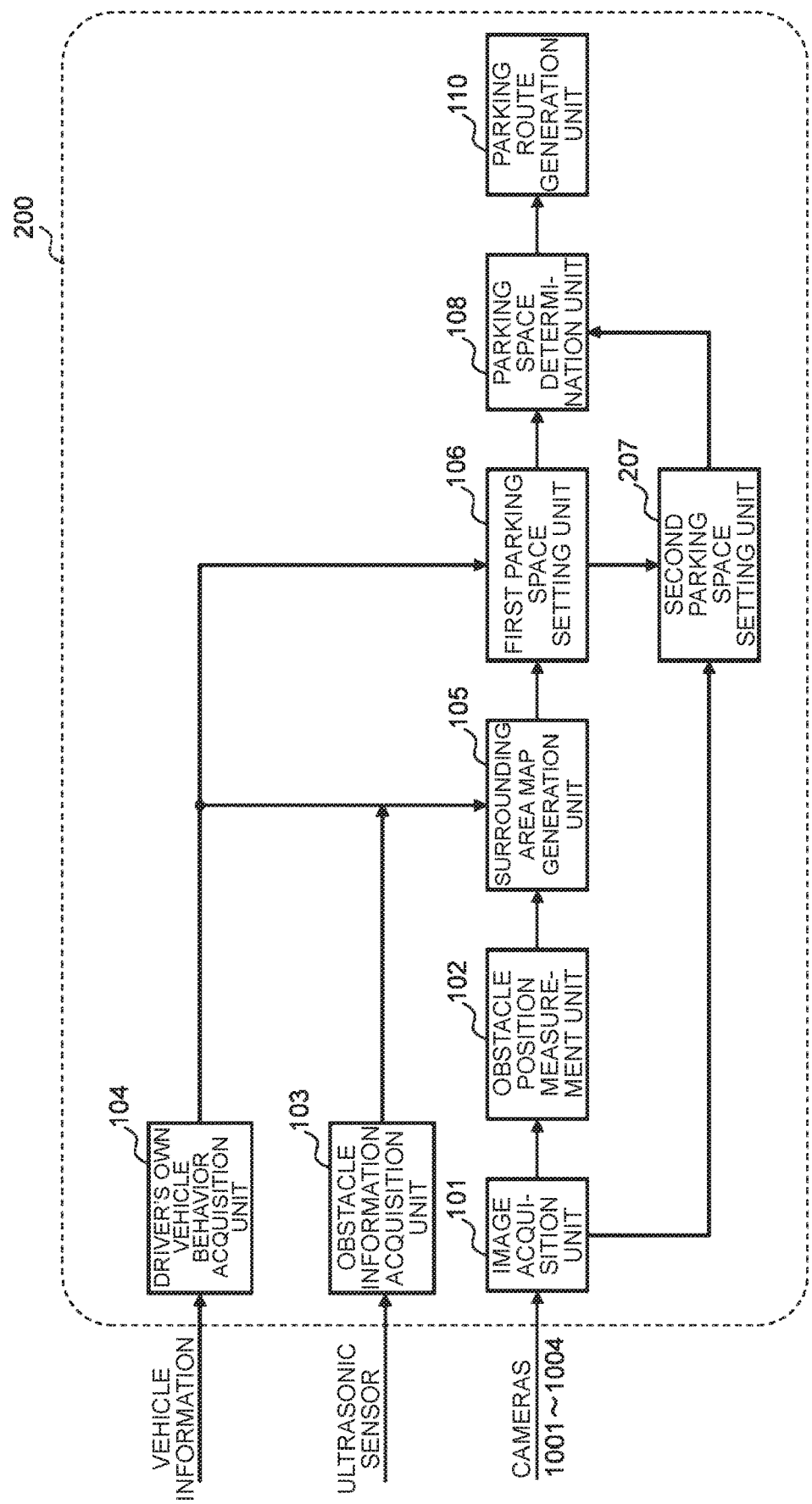
FIG. 12 is a block diagram of a parking support apparatus according to a second embodiment.

FIG. 12 is a block diagram of a parking support apparatus 200 according to the second embodiment. Incidentally, in the following explanation, the same reference numerals are assigned to the same parts as those in the parking support apparatus 100 according to the first embodiment and an explanation about them is omitted. The difference between the second embodiment and the first embodiment is that in the second embodiment, a second parking space setting unit 207 sets a parking space by using an image(s) acquired by the image acquisition unit 101.

The parking support apparatus 200 is incorporated into a camera device, which is mounted in a vehicle, or into an integrated controller and supports parking the vehicle. In this embodiment, the parking support apparatus 200 supports parking the vehicle on the basis of the results of sensing by cameras 1001 to 1004 and a sonar (which is not illustrated in the drawing) which are mounted around the driver's own vehicle.

The parking support apparatus 200 includes, as illustrated in FIG. 12, the image acquisition unit 101, the obstacle position measurement unit 102, the obstacle information acquisition unit 103, the driver's own vehicle behavior acquisition unit 104, the surrounding area map generation unit 105, the first parking space setting unit 106, the second parking space setting unit 207, the parking space determination unit 108, and the parking route generation unit 110. Incidentally, without limitation to the above-described configuration, the parking support apparatus 200 may be configured of a computer including a CPU, a memory, an I/O, and so on and be configured to execute programs illustrated in flowcharts described later.

The image acquisition unit 101 acquires images including the surrounding environment of the driver's own vehicle 10. The image acquisition unit 101 acquires the respective images IMGSRC[c][x][y] which can be acquired from the four cameras in the same manner as in the first embodiment.

The obstacle position measurement unit 102 extracts feature points FP[p] from the input images IMGSRC[c][x][y] and measures the point group information IOP[p] of the 3-dimensional distances on the basis of chronologically tracked movements of the feature points FP[p] in the images (time-series changes of the feature points) in the same manner as in the first embodiment.

The obstacle information acquisition unit 103 acquires the obstacle information SOP[b] of obstacles around the driver's own vehicle according to a detection signal of a sonar (ultrasonic) sensor for detecting the objects around the driver's own vehicle in the same manner as in the first embodiment.

The driver's own vehicle behavior acquisition unit 104 acquires the vehicle behaviors DRC calculated inside or outside the parking support apparatus 200. The vehicle behaviors DRC include velocities (VX, VY) and a yaw rate (YR) relative to the two-dimensional world coordinates which do not include the height.

The surrounding area map generation unit 105 generates a surrounding area map MP by using the obstacle information IOP[p] acquired from the obstacle position measurement unit 102, the obstacle information SOP[b] acquired from the obstacle information acquisition unit 103, and the vehicle behaviors DRC and integrating them as a point group MOP[d] of two-dimensional absolute coordinates in the same manner as in the first embodiment.

The first parking space setting unit 106 calculates the first parking space PS1[q] where the driver's own vehicle can be parked around the driver's own vehicle, from the obstacle point group MOP[d] in the surrounding area map MP in the same manner as in the first embodiment.

The second parking space setting unit 207 calculates the second parking space PS2[q], which is obtained by correcting the first parking space PS1[q], from the first parking space PS1[q] and the camera image IMGSRC[c][x][y]. The details of the processing will be explained later.

The parking space determination unit 108 determines either the first parking space PS1[q] or the second parking space PS2[q] as the parking space PS[q] according to the reliability of the second parking space PS2[q] in the same manner as in the first embodiment.

The parking route generation unit 110 generates a parking route for parking the driver's own vehicle by using the parking position and the parking angle of the parking space PS[q] set by the parking space determination unit 108. A known means is used to generate the parking route.

<Regarding Second Parking Space Setting Unit>

Figure 13:
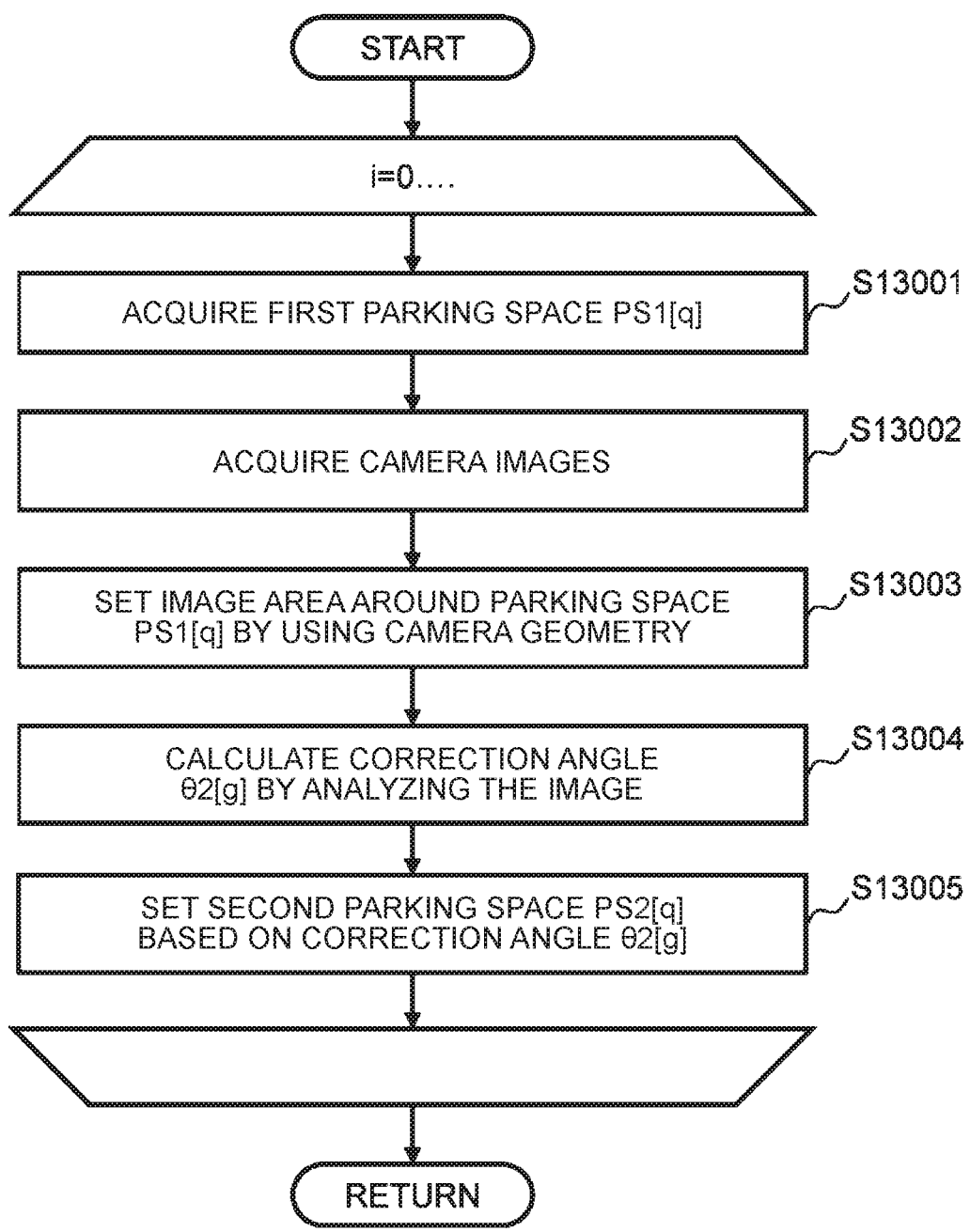
FIG. 13 is a flowchart illustrating processing by a second parking space setting unit according to the second embodiment.
Figure 14A:
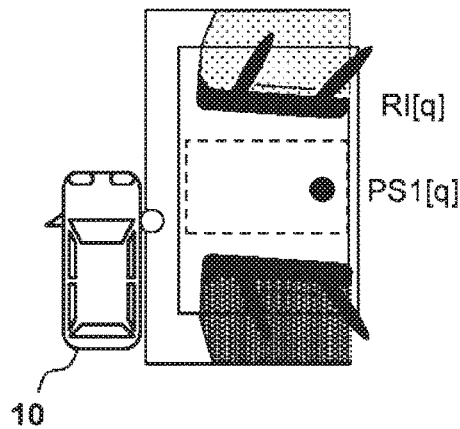
FIGS. 14A to 14C are explanatory diagrams of processing by the second parking space setting unit according to the second embodiment.
Figure 14C:
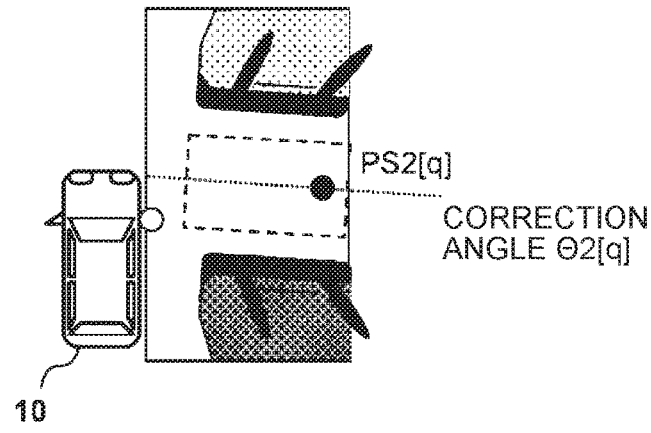
Figure 14B:
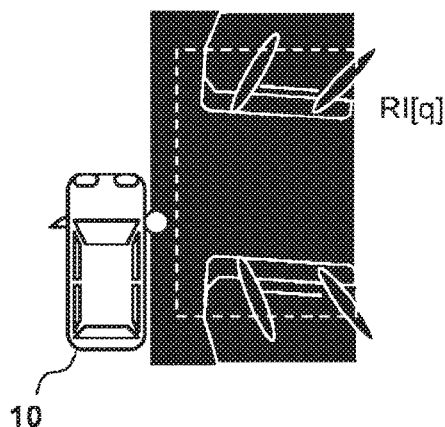

The processing by the second parking space setting unit 207 will be explained with reference to FIGS. 13 and 14A-14C. FIG. 13 is a flowchart illustrating the processing by the second parking space setting unit 207. FIGS. 14A to 14C are explanatory diagrams of the processing by the second parking space setting unit 207.

The second parking space setting unit 207 calculates the parking space PS2[q] by using a camera image IMGSRC[c][x][y] including the first parking space PS1[q] acquired from the first parking space setting unit 106. The second parking space PS2[q] is a table including three pieces of information, that is, the parking position (X2, Y2) and the parking angle θ2 of the driver's own vehicle.

In step S13001 of FIG. 13, the first parking space PS1[q] is acquired. Next, in step S13002, the camera image IMGSRC[c][x][y] including the first parking space PS1[q] is acquired. Under this circumstance, the first parking space PS1[q] is generated on the right side or the left side of the driver's own vehicle 10, so that an image of the corresponding right camera 1003 or the corresponding left camera 1002 is acquired.

Next, in step S13003, an image area RI[q] including the first parking space PS1[q] is set by specifying its position in the camera image IMGSRC[c][x][y] by using an internal parameter of the camera and an external parameter upon attachment and using geometry information of the first parking space PS1[q].

FIG. 14A is an example of the image area RI[q] set in step S13002 and step S13003. In step S13002, the camera image is converted to an overhead view image and the first parking space PS1[q] is set in the converted overhead view image. Then, in step S13003 of FIG. 13, the image area RI[q] is set. FIG. 14A illustrates an example where other vehicles are parked on both sides of the first parking space PS1[q].

In step S13004 of FIG. 13, edge points and their edge angles are detected from the image and a histogram of the angles of the edge points in the image area RI[q] is generated. For example, when the edge angles of the edge points are obtained from −180 degrees to 180 degrees, a histogram for which the resolution is 10 degrees and the number of bins is 36 is generated and an angle range where the largest votes can be obtained is calculated. Then, an average of the edge angles corresponding to the angle range where the largest votes are obtained is calculated and is defined as the correction angle $\theta 2[q]$.

FIG. 14B is a schematic diagram explaining processing for calculating the edge points and their edge angles and aggregating the edge points in the image area RI[q] in step S13004.

Next, in step S13005 of FIG. 13, the second parking space PS2[$q$] is found based on the correction angle $\theta 2[q]$. Under this circumstance, the rear wheel axle position (X1, Y1) of the first parking space PS1[$q$] is used as (X2, Y2) as they are and the correction angle $\theta 2[q]$ is replaced with the parking angle. FIG. 14C is a diagram illustrating this state.

The most frequent angle is calculated by using edge frequency information from the camera image near the parking space PS1[$q$] set by the first parking space setting unit 106 based on the obstacle information and the second parking space PS2[$q$] regarding which the parking angle is replaced with that angle is generated as explained above.

Accordingly, even when any position error exists in the obstacle(s) detected by the cameras and the sonar, the angle is corrected based on the edge angle information acquired from the cameras, so that the parking angle can be set optimally and the possibility of executing parking with a wrong route when generating the parking route reduces. Consequently, it is possible to reduce wasteful changes in the moving direction to park the vehicle when executing the parking support.

Third Embodiment

A third embodiment of the present invention will be explained with reference to FIG. 15 and FIGS. 16A to 16D.

Figure 15:
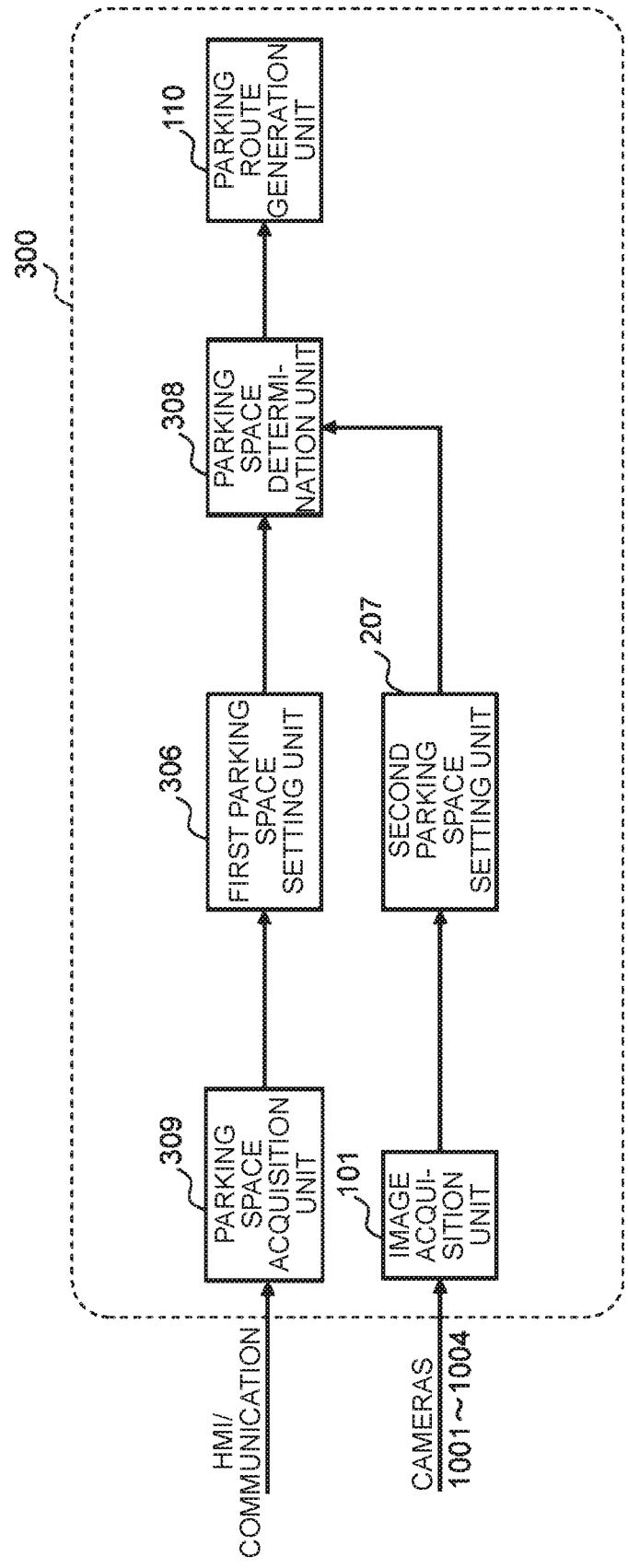
FIG. 15 is a block diagram of a parking support apparatus according to a third embodiment.

FIG. 15 is a block diagram of a parking support apparatus 300 according to the third embodiment. Incidentally, in the following explanation, the same reference numerals are assigned to the same parts as those in the parking support apparatus 100 according to the first embodiment and the parking support apparatus 200 according to the second embodiment, and an explanation about them is omitted.

In the third embodiment, only the cameras are used as sensors and a parking space acquisition unit 309 which acquires a parking space and a first parking space setting unit 306 which sets the first parking space based on the acquired parking space exist.

The parking support apparatus 300 includes the image acquisition unit 101, the parking space acquisition unit 309, the first parking space setting unit 306, the second parking space setting unit 207, a parking space determination unit 308, and the parking route generation unit 110 as illustrated in FIG. 15. Incidentally, without limitation to the above-described configuration, the parking support apparatus 300 may be configured of a computer including a CPU, a memory, an I/O, and so on and be configured to execute programs illustrated in flowcharts described later.

The image acquisition unit 101 acquires images including the surrounding environment of the driver's own vehicle 10. The image acquisition unit 101 acquires the respective images IMGSRC[c][x][y] which can be acquired from the four cameras in the same manner as in the first embodiment.

The parking space acquisition unit 309 acquires a parking space candidate(s) PS0[$q$] around the driver's own vehicle according to signals from other sensors and from outside. The parking space candidate PS0[$q$] includes a rear wheel axle position (X0, Y0) at the time of completion of parking and an angle $\theta 0[q]$ of the driver's own vehicle 10 at the time of parking. These pieces of information may be acquired from an HMI device (Human Machine Interface device) connected to the parking support apparatus 300, otherwise acquired from outside via communication, acquired by directly inputting sensor signals to the parking support apparatus 300, or acquired from an external apparatus via communication using a LAN (Local Area Network).

The first parking space setting unit 306 calculates the first parking space PS1[$q$] based on the parking space candidate(s) PS0[$o$]. The first parking space PS1[$q$] may be calculated from the parking space candidate PS0[$o$] to select a parking space which satisfies specified conditions, for example, a parking space whose position is close to the driver's own vehicle 10 or which makes it possible to easily create a parking route.

The second parking space setting unit 207 calculates the second parking space PS2[$q$], which is obtained by correcting the first parking space PS1[$q$], from the first parking space PS1[$q$] and the camera image IMGSRC[c][x][y] in the same manner as in the second embodiment.

The parking space determination unit 308 determines either the first parking space PS1[$q$] or the second parking space PS2[$q$] as the parking space PS[q] according to the reliability of the second parking space PS2[$q$]. In this embodiment, two types of processing will be explained.

First type of processing is to calculate the difference between the parking angle $\theta 1[q]$ for the first parking space PS1[$q$] and the parking angle $\theta 2[q]$ for the second parking space PS2[$q$]; and when the difference is small, the second parking space PS2[$q$] is determined as the parking space PS[q]. Otherwise, the first parking space PS1[$q$] is determined as the parking space PS[q].

Second type of processing is to acquire an edge amount from an image area RI[q] in the vicinity of the first parking space PS1[$q$] used by the second parking space setting unit 207. Then, when this edge amount is equal to or more than a specified value, the second parking space PS2[$q$] is determined as the parking space PS[q]. Otherwise, the first parking space PS1[$q$] is determined as the parking space PS[q].

The parking route generation unit 110 generates a parking route for parking the driver's own vehicle by using the parking position and the parking angle of the parking space PS[q] set by the parking space determination unit 308. A known means is used to generate the parking route.

This embodiment assumes, for example, a case where the parking position and the angle are assigned from outside of the parking support apparatus 300 via the HMI or the like which is connected externally. The assigned parking position and angle are determined as the first parking space PS1[$q$], the edges are detected from the image including the parking position by using the camera image including the first parking space PS1[$q$], the most frequent angle of the edge is calculated, and the second parking space PS2[$q$] is generated by correcting the angle to the above-calculated angle. Consequently, the optimum parking angle can be set based on texture information of the surrounding area.

Figure 16A:
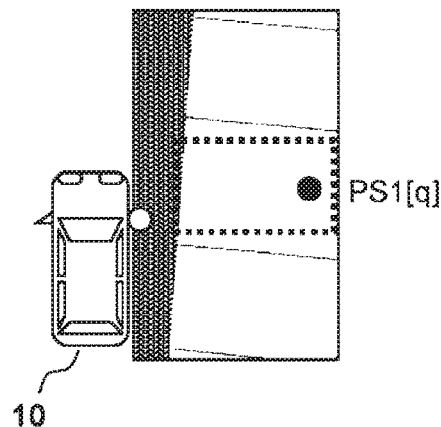
FIGS. 16A to 16D are explanatory diagrams of processing by a second parking space setting unit according to the third embodiment.
Figure 16B:
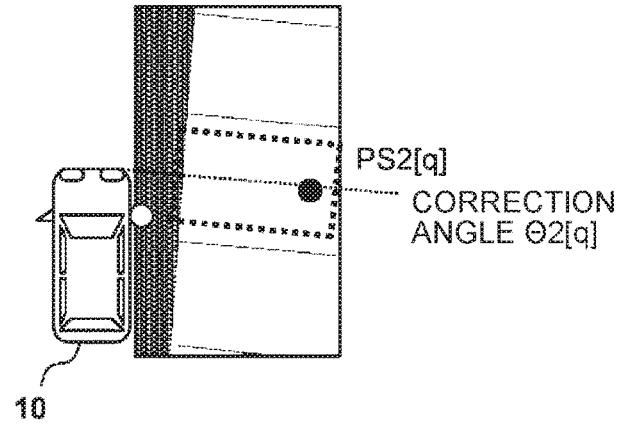
Figure 16C:
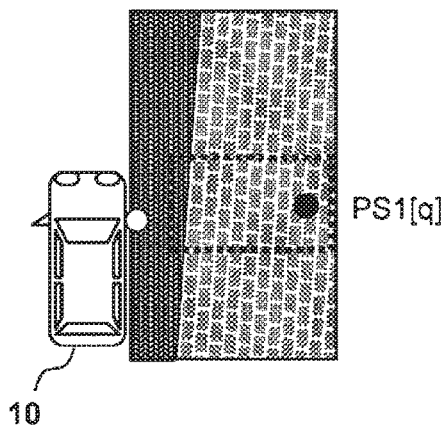
Figure 16D:
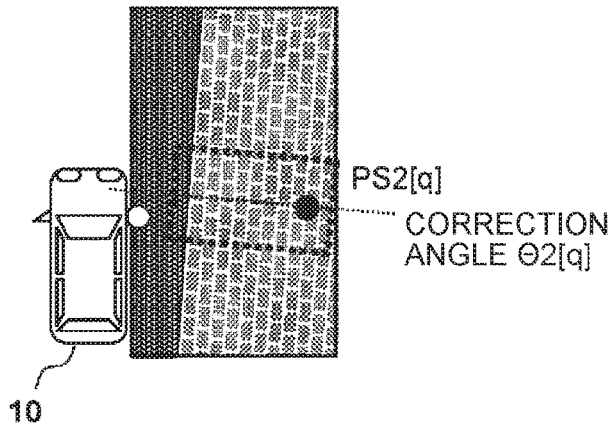

FIGS. 16A to 16D are diagrams explaining processing by the second parking space setting unit 207 according to the third embodiment. FIG. 16A illustrates a case where other vehicles or a frame line of the parking area do not exist around the driver's own vehicle 10. Even in the case of such a parking area, obstacle information which serves as an angle reference for parking, such as a cut line in concrete, may sometimes exist. In this embodiment, such obstacle information is acquired from the edges and is reflected in the parking angle as illustrated in FIG. 16B. However, there may be a case where it would be better to not set the parking angle according to the edge angle depending on the scene. So, when the difference between the parking angle of the first parking space PS1[$q$] which is set by a user by means of the HMI and the parking angle of the second parking space PS2[$q$] is large, it means that the parking angle is significantly different from the angle designated by the user; and, therefore, the first parking space which is the angle designated by the user is determined as the parking position. On the other hand, when the angle difference is small, it is determined that the angle with a finer resolution than that of the parking angle which is set by the user has been detected successfully by using the sensors; and, therefore, the second parking space PS2[$q$] is adopted. Furthermore, as illustrated in FIG. 16C, information which serves as the reference for the parking angle, such as seam joints of bricks or tiles, may sometimes exist. In this embodiment, such information is acquired from the edges and is reflected in the parking angle as illustrated in FIG. 16D.

The case where the parking space information is acquired by using the HMI has been explained above as an example; however, for example, the same applies to a case where the parking space information is acquired via communication or the like.

The parking angle can be set optimally by adjusting the parking space information, which is acquired from outside, on the basis of the image information from the cameras mounted on the driver's own vehicle as described above, so that the possibility of executing parking with a wrong route when generating the parking route reduces. Consequently, it is possible to reduce wasteful changes in the moving direction to park the vehicle when executing the parking support.

Fourth Embodiment

A fourth embodiment of the present invention will be explained with reference to FIG. 17 to FIG. 19C.

Figure 17:
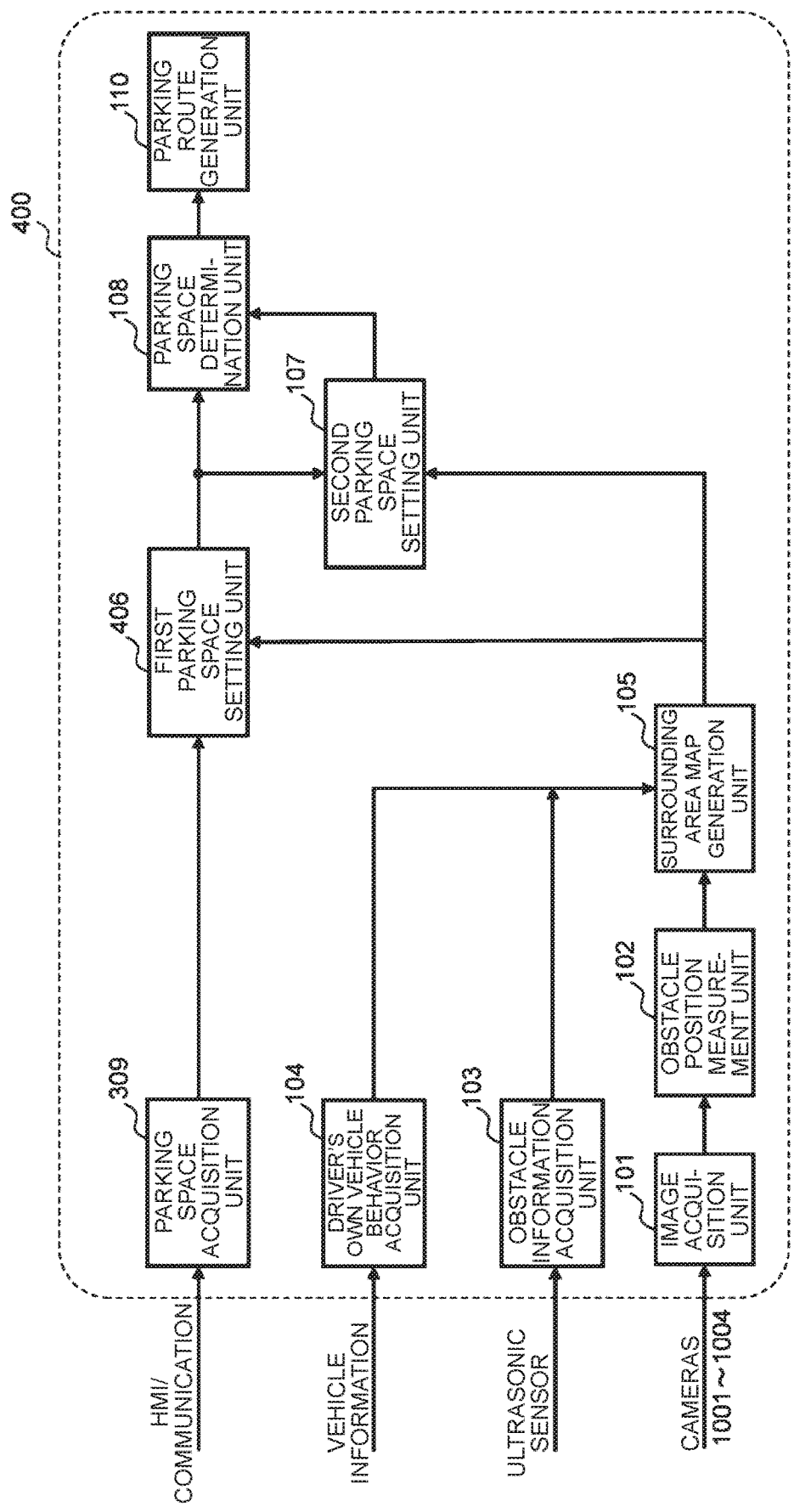
FIG. 17 is a block diagram of a parking support apparatus according to a fourth embodiment.

FIG. 17 is a block diagram of a parking support apparatus 400 according to the fourth embodiment. Incidentally, in the following explanation, the same reference numerals are assigned to the same parts as those in the parking support apparatus 100 according to the first embodiment and the parking support apparatus 300 according to the third embodiment and an explanation about them is omitted.

In the fourth embodiment, the parking space acquisition unit 309 indicated in the third embodiment and a first parking space setting unit 406 are included.

The parking support apparatus 400 is incorporated into a camera device, which is mounted in the vehicle 10, or into an integrated controller and supports parking the vehicle. In this embodiment, the parking support apparatus 400 supports parking the vehicle on the basis of the results of sensing by cameras 1001 to 1004 and a sonar (which is not illustrated in the drawing) which are mounted around the driver's own vehicle.

The parking support apparatus 400 includes, as illustrated in FIG. 17, the image acquisition unit 101, the obstacle position measurement unit 102, the obstacle information acquisition unit 103, the driver's own vehicle behavior acquisition unit 104, the parking space acquisition unit 309, the first parking space setting unit 406, the second parking space setting unit 107, the parking space determination unit 108, and the parking route generation unit 110. Incidentally, without limitation to the above-described configuration, the parking support apparatus 400 may be configured of a computer including a CPU, a memory, an I/O, and so on and be configured to execute the program illustrated in the flowcharts described later.

The image acquisition unit 101 acquires images including the surrounding environment of the driver's own vehicle 10. The image acquisition unit 101 acquires the respective images IMGSRC[c][x][y] which can be acquired from the four cameras 1001 to 1004 in the same manner as in the first embodiment.

The obstacle position measurement unit 102 extracts feature points FP[p] from the input images IMGSRC[c][x][y] and measures the point group information IOP[p] of the 3-dimensional distances on the basis of chronologically tracked movements of the feature points FP[p] in the images (time-series changes of the feature points) in the same manner as in the first embodiment.

The obstacle information acquisition unit 103 acquires the obstacle information SOP[b] of obstacles around the driver's own vehicle according to a detection signal of a sonar (ultrasonic) sensor for detecting the objects around the driver's own vehicle in the same manner as in the first embodiment.

The driver's own vehicle behavior acquisition unit 104 acquires the vehicle behaviors DRC calculated inside or outside the parking support apparatus 400. The vehicle behaviors DRC include velocities (VX, VY) and a yaw rate (YR) relative to the two-dimensional world coordinates which do not include the height.

The surrounding area map generation unit 105 generates a surrounding area map MP by using the obstacle information IOP[p] acquired from the obstacle position measurement unit 102, the obstacle information SOP[b] acquired from the obstacle information acquisition unit 103, and the vehicle behaviors DRC and integrating them as a point group MOP[d] of two-dimensional absolute coordinates in the same manner as in the first embodiment.

The parking space acquisition unit 309 acquires a parking space candidate(s) PS0[$q$] around the driver's own vehicle according to signals from other sensors and from outside in the same manner as in the third embodiment.

The first parking space setting unit 406 calculates the first parking space PS1[$q$] where the driver's own vehicle 10 can be parked around the driver's own vehicle, from the obstacle point group MOP[d] in the surrounding area map MP. The details of the processing will be explained later.

The second parking space setting unit 107 calculates the second parking space PS2[$q$], which is obtained by correcting the first parking space PS1[$q$], from the first parking space PS1[$q$] and the obstacle point group MOP[d] in the surrounding area map MP in the same manner as in the first embodiment.

The parking space determination unit 108 determines either the first parking space PS1[$q$] or the second parking space PS2[$q$] as the parking space PS[q] according to the reliability of the second parking space PS2[$q$] in the same manner as in the first embodiment.

The parking route generation unit 110 generates a parking route for parking the driver's own vehicle by using the parking position and the parking angle of the parking space PS[q] set by the parking space determination unit 108. A known means is used to generate the parking route.

Figure 18:
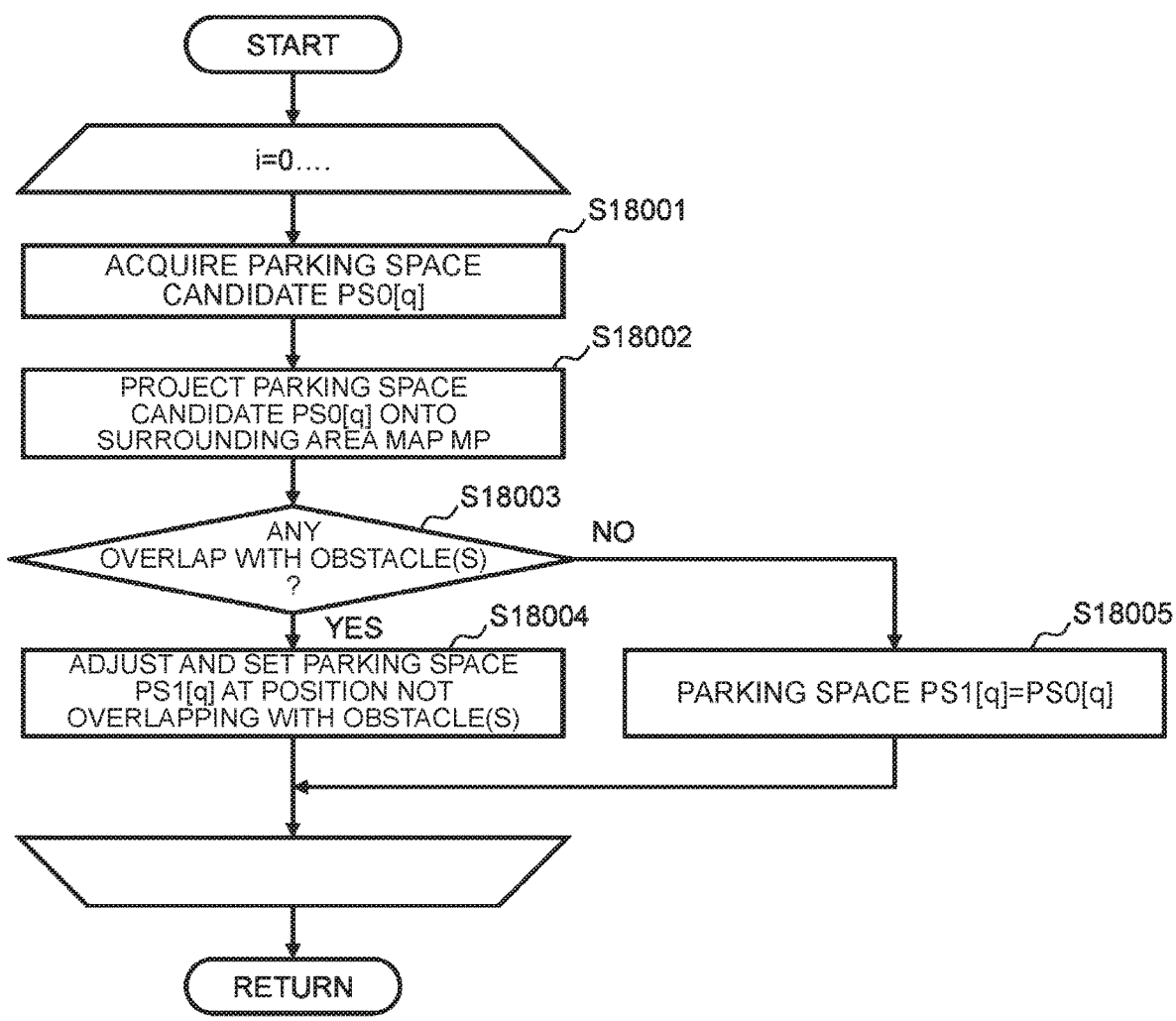
FIG. 18 is a flowchart illustrating processing by a first parking space setting unit according to the fourth embodiment.

The processing by the first parking space setting unit 406 will be explained with reference to FIGS. 18 and 19. FIG. 18 is a flowchart illustrating the processing by the first parking space setting unit according to this embodiment. FIGS. 19A to 19C are diagrams explaining the processing by the first parking space setting unit 406.

In step S18001 of FIG. 18, a parking space candidate(s) PS0[$q$] is acquired according to signals from other sensors and from outside. The parking space candidate PS0[$q$] includes a rear wheel axle position (X0, Y0) at the time of completion of parking and an angle θ0[$q$] of the driver's own vehicle 10 at the time of parking. These pieces of information may be acquired from an HMI device connected to the parking support apparatus 400, acquired from outside via communication, acquired by directly inputting sensor signals to the parking support apparatus 400, or acquired from an external apparatus via communication using a LAN (Local Area Network).

Next, in step S18002, the parking space candidate PS0[$q$] is projected onto the surrounding area map MP and whether the parking space candidate PS0[$q$] overlaps with the obstacle point group MOP[d] or not is judged.

Subsequently, in step S18003, if the parking space candidate PS0[$q$] overlaps with the obstacle point group MOP[d], the processing proceeds to step S18004 and the parking space PS1[$q$] is set at a position where the parking space does not overlap with any obstacle. In this embodiment, the shortest position without any overlap with the obstacle point group MOP[d] is calculated on the right side and the left side by keeping the parking angle θ0[$q$] of the parking space candidate PS0[$q$] as it is, and moving the parking position to the left or the right. Then, a position with the shortest moving distance is registered as the first parking space PS1[$q$].

Figure 19A:
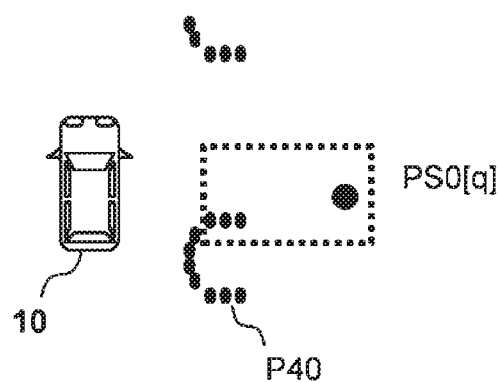
FIGS. 19A to 19C are explanatory diagrams of processing by the first parking space setting unit according to the fourth embodiment.
Figure 19C:
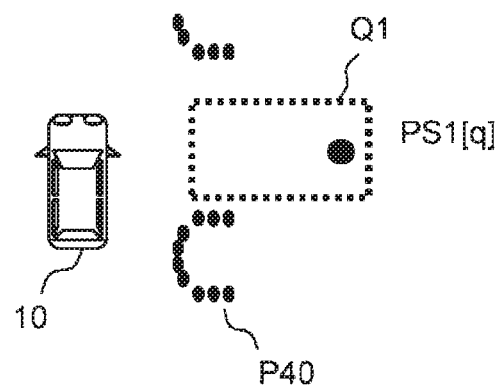
Figure 19B:
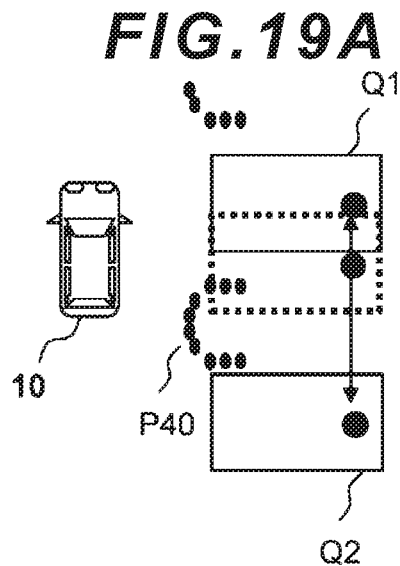

FIGS. 19A to 19C illustrate an example of the processing in step S18003 and step S18004. Referring to FIG. 19A, the parking space candidate PS0[$q$] which is expressed as a rectangle of a dotted line overlaps with an obstacle P40 which is indicated as part of the obstacle point group MOP[d]. Then, referring to FIG. 19B, the parking space candidate PS0[$q$] is parallel-translated and two candidate positions Q1, Q2 which do not overlap with the obstacle P40 are calculated. Next, as illustrated in FIG. 19C, the position Q1 which is moved to the side with a shorter moving distance to the driver's own vehicle 10 is registered as a first parking position PS1[$q$].

On the other hand, if it is determined in step S18003 of FIG. 18 that the parking space candidate PS0[$q$] does not overlap with the obstacle P40, the processing proceeds to step S18005 and the parking space candidate PS0[$q$] is set as the first parking space PS1[$q$].

If the parking space candidate PS0[$q$] acquired by the parking space acquisition unit 309 from outside such as the HMI or via communication contradicts the obstacle MOP[d] in the surrounding area map sensed by the driver's own vehicle, the first parking space setting unit 406 adjusts the parking position as described above. Furthermore, the second parking space setting unit 107 adjusts the parking angle. As a result, the parking space information which is acquired from outside can be adjusted optimally based on the sensing information and the possibility of executing parking with a wrong route when generating the parking route reduces. Consequently, it is possible to reduce wasteful changes in the moving direction to park the vehicle when executing the parking support.

Figure 20A:
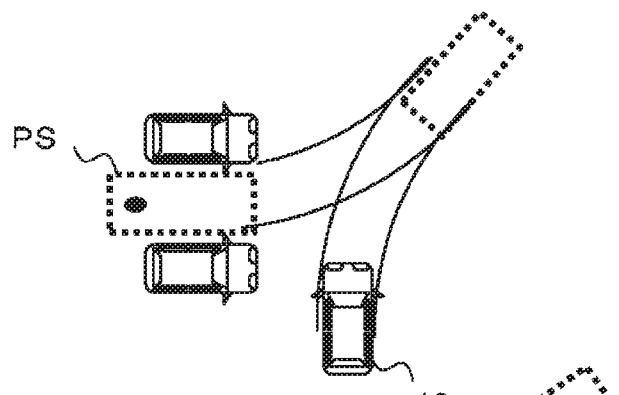
FIGS. 20A to 20C is a diagram explaining corrections of a parking angle.
Figure 20B:
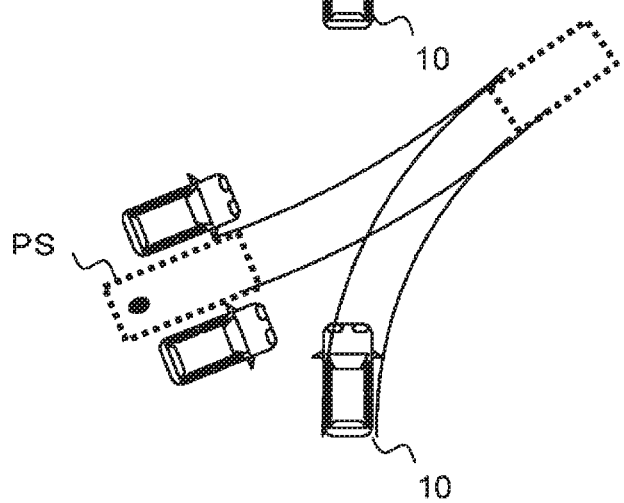
Figure 20C:
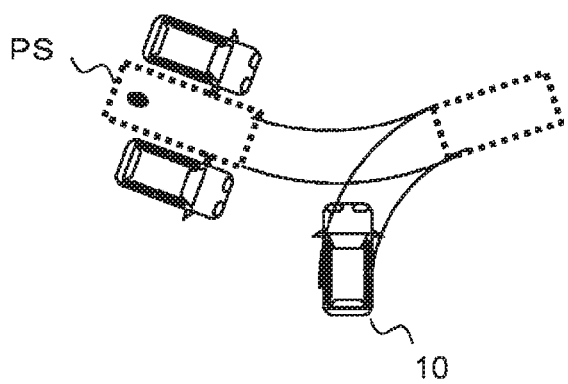

As explained in the first embodiment to the fourth embodiment, the second parking space which is obtained by correcting at least the parking angle of the first parking space is calculated. FIGS. 20A to 20C are diagrams explaining the correction of the parking angle.

Each of FIG. 20A to FIG. 20C illustrates an example where the parking space PS is detected ahead of the driver's own vehicle 10 on the left. The parking angle is different in each case where a parking route is drawn.

FIG. 20A illustrates a case where the parking angle is almost perpendicular to the driver's own vehicle 10. In this case, the route is designed so that: the driver's own vehicle 10 will gently turn to the right until it reaches an angle approximately intermediate between a final parking angle and the angle of the driver's own vehicle 10; and then after reaching a point to change the moving direction, the driver's own vehicle 10 will also gently turn in the same manner and move backward towards the parking position.

FIG. 20B illustrates a case where the parking angle leans towards the front of the driver's own vehicle 10. In this case, the route is designed so that the driver's own vehicle 10 will turn along an extension line from the final parking position and then move almost straight backwards.

FIG. 20C illustrates a case where the parking angle leans towards the driver's own vehicle 10 side. In this case, the route is designed so that the driver's own vehicle 10 will move forwards and make a big turn to the right and then move backwards and make a big turn in the same manner towards the parking position.

Accordingly, even if the parking position is the same, the parking route varies significantly depending on the parking angle. Therefore, if the parking angle is mistaken when generating the parking route, even if a correct angle can be recognized at the timing when approaching to the parking position, it has been necessary to move out of the parking space once and then correct the parking angle to the correct parking angle while changing the moving direction.

According to each embodiment of the present invention, the parking angle can be corrected appropriately after starting the parking support and before entering the parking space, so that the correct parking route can be generated.

According to the embodiments explained above, the following operations and advantages can be obtained.

(1) The parking support apparatus 100, 200, 300, 400 includes: the first parking space setting unit 106, 306, 406 which sets the first parking space including the parking position and the parking angle of the vehicle 10 at the parking completion position; the second parking space setting unit 107, 207 which calculates the second parking space, which is obtained by correcting the parking angle of the first parking space, on the basis of the information obtained by measuring the first parking space by using the driver's own vehicle surrounding sensor for measuring the surrounding area of the vehicle 10; the parking space determination unit 108, 308 which calculates the reliability of the second parking space and determines to use either the first parking space or the second parking space on the basis of the calculated reliability; and the parking route generation unit 110 which generates the parking route to the first parking space or the second parking space determined by the parking space determination unit 108, 308. Consequently, it becomes no longer necessary to move the vehicle again to park after entering the parking space and the time required to park the vehicle can be reduced.

The present invention is not limited to the above-described embodiments; and unless the features of the present invention are impaired, other possible aspects which can be thought of within the scope of the technical idea of the present invention are also included in the scope of the present invention. Furthermore, the present invention may be configured as a combination of the aforementioned embodiments.

The disclosure of the following priority application is herein incorporated by reference: Japanese Patent Application No. 2018-222512 filed Nov. 18, 2018.

REFERENCE SIGNS LIST 100, 200, 300, 400: parking support apparatus
101: image acquisition unit
102: obstacle position measurement unit
103: obstacle information acquisition unit
104: driver's own vehicle behavior acquisition unit
105: surrounding area map generation unit
106, 306, 406: first parking space setting unit
107, 207: second parking space setting unit
108, 308: parking space determination unit
110: parking route generation unit
309: parking space acquisition unit
1001 to 1004: cameras

The invention claimed is:

1. An apparatus that improves an amount of time required to park a vehicle in a target parking space, the apparatus comprising:
a memory that stores parking positions and parking angles of the vehicle at a parking completion position within the target parking space, wherein the target parking space defines an area for the vehicle to park;
a communication interface that is communicatively coupled to a sensor that measures a surrounding area of the target parking space; and
a central processing unit (CPU) that is conductively coupled to the memory and the communication interface, wherein the CPU is configured to:
acquire a first set of images of a plurality of obstacles from the sensor when the vehicle was located at a first location,
acquire a second set of images of the plurality of obstacles from the sensor when the vehicle is located at a second location,
determine 3-Dimensional points for each of the plurality of obstacles based on a parallax of the first set of images and the second set of images,
generate a surrounding area map based on the 3-Dimensional points for each of the plurality of obstacles,
calculate a first parking space within the area of the target parking space and a first parking angle of the vehicle at the parking completion position within the target parking space at a first position of the vehicle in relation to the target parking space, wherein the first parking space is calculated based on the surrounding area map;
calculate a second parking space within the area of the target parking space and a second parking angle of the vehicle for the second parking space within the target parking space, by adjusting the first parking angle of the first parking space, based on measurements of the surrounding area received from the sensor, at a second position of the vehicle in relation to the target parking space, wherein the second position is closer to the target parking space than the first position;
establish a line that is perpendicular to a rear wheel axle of the vehicle at a time point in time when the apparatus was activated as a reference axis,
calculate, prior to the vehicle entering the area of the target parking space, a difference between the first parking angle and the second parking angle, wherein the first parking angle and the second parking angle are angles relative to the reference axis,
determine to use the second parking space when the difference between the first parking angle and the second parking angle is equal to or less than a predetermined value,
determine to use the first parking space when the difference between the first parking angle and the second parking angle is more than the predetermined value; and
generate a parking route to the first parking space or the second parking space based on whether the first parking space or the second parking space is determined to be used.

2. The apparatus according to claim 1, wherein the sensor includes a camera; and
the CPU further is further configured to:
calculate the second parking angle based on an edge angle of an obstacle image acquired by the camera.

3. The apparatus according to claim 1, wherein the CPU is further configured to:
acquire behavior information of the vehicle;
wherein the surrounding area map around is further generated based on the behavior information.

4. The apparatus according to claim 3, wherein the CPU is further configured to:
set the first parking angle in the first parking space based on the behavior information.

5. The apparatus according to claim 3, wherein the CPU is further configured to:
calculate the second parking angle in the second parking space based on obstacle information.

6. The apparatus according to claim 1, wherein the CPU is further configured to:
acquire parking space information including the respective parking position of the vehicle and the respective parking angle of the vehicle at the parking completion position, and
calculate the first parking space based on the parking space information.

7. The apparatus according to claim 6, wherein the CPU is further configured to:
acquire the parking space information from an external apparatus.

8. The apparatus according to claim 6, wherein the CPU is further configured to:
acquire behavior information of the vehicle; and
when the acquired parking space information overlaps with at least one the plurality of the obstacles in the surrounding area map, adjust a position of the parking space so that the acquired parking space no longer overlaps with the at least one of the plurality of obstacles, and set the adjusted position of the parking space as the first parking space.

9. The apparatus according to claim 1, wherein the first parking angle is an angle perpendicular to the reference axis.

10. The apparatus according to claim 1, wherein when the vehicle turns with a turning radius relative to the reference axis the first parking angle is calculated based on the turning radius.

11. The apparatus according to claim 1, wherein the parking angle of and/or the second parking angle is calculated based on at least one of the plurality of obstacles.

* * * * *